United States Patent
Sone et al.

(10) Patent No.: US 10,763,986 B2
(45) Date of Patent: Sep. 1, 2020

(54) TRANSMISSION DEVICE, OPTICAL TERMINATION DEVICE, TRANSMISSION SYSTEM, AND TRANSMISSION METHOD

(71) Applicant: FUJITSU LIMITED, Kawasaki-shi, Kanagawa (JP)

(72) Inventors: Kyosuke Sone, Kawasaki (JP); Goji Nakagawa, Sagamihara (JP); Yoshio Hirose, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/533,745

(22) Filed: Aug. 6, 2019

(65) Prior Publication Data
US 2020/0052807 A1 Feb. 13, 2020

(30) Foreign Application Priority Data
Aug. 13, 2018 (JP) ................................. 2018-152219

(51) Int. Cl.
*H04J 14/02* (2006.01)
*H04B 10/29* (2013.01)
*H04B 10/40* (2013.01)

(52) U.S. Cl.
CPC ............. *H04J 14/02* (2013.01); *H04B 10/29* (2013.01); *H04B 10/40* (2013.01)

(58) Field of Classification Search
CPC .......... H04B 10/29; H04B 10/40; H04J 14/02
USPC ....................................................... 398/79
See application file for complete search history.

(56) References Cited

U.S. PATENT DOCUMENTS

| | | | | |
|---|---|---|---|---|
| 7,715,721 B2* | 5/2010 | Solheim | ............. | H04J 14/0246 398/97 |
| 2008/0145056 A1* | 6/2008 | Boldi | ................. | H04J 14/0252 398/96 |
| 2017/0155981 A1* | 6/2017 | Nakagawa | ......... | H04Q 11/0005 |
| 2019/0253147 A1* | 8/2019 | Kwon | .................... | H04B 10/29 |

FOREIGN PATENT DOCUMENTS

JP 2014-110574 A 6/2014
JP 2014-165614 A 9/2014

* cited by examiner

*Primary Examiner* — Dalzid E Singh
(74) *Attorney, Agent, or Firm* — Fujitsu Patent Center

(57) ABSTRACT

A transmission device includes an interface configured to acquire, from a base band unit having a communication destination that is one of remote radio heads, communication destination information relating to the remote radio head of the communication destination, a receiver configured to receive signals of given wavelength from optical termination devices, and a transmitter configured to transmit a first signal that includes wavelength information indicative of the given wavelength and the communication destination information to optical termination devices, wherein, when the receiver receives, from an optical termination device of the remote radio head of the communication destination from among optical termination devices, a second signal of the given wavelength according to the first signal, the receiver sets, between the receiver and the optical termination device, a relay path that relays communication between the base band unit and the remote radio head of the communication destination.

13 Claims, 26 Drawing Sheets

FIG. 4
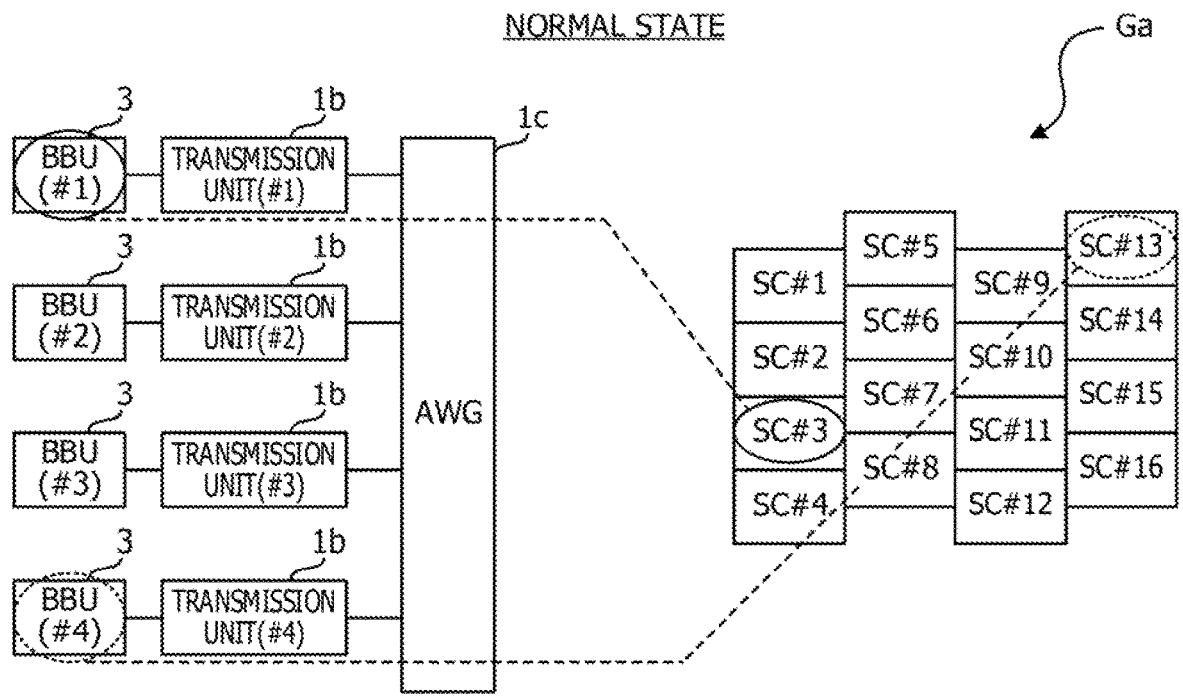
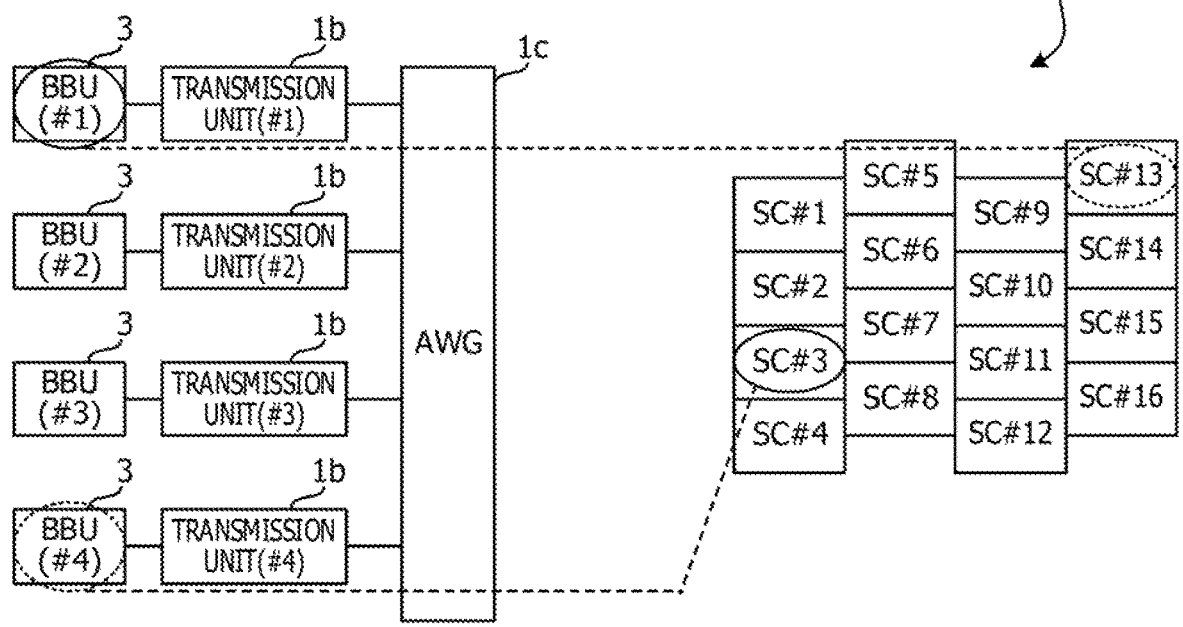

FIG. 9

Channel_Profile MESSAGE

| Octet | 31-24 | 23-16 | 15-8 | 7-0 |
|---|---|---|---|---|
| 1-4 | ONU-ID | | Message type ID | SeqNo |
| 5-8 | Control octet | Channel profile index | | Channel profile version |
| 9-12 | PON-ID | | | |
| 13-16 | Service type | DWLCH ID | | Downstream frequency |
| 17-20 | Downstream frequency | | | Downstream rate |
| 21-24 | Channel partition | UWLCH ID | | Upstream frequency |
| 25-28 | Upstream frequency | | | Upstream rate |
| 29-32 | PON-TAG digest | | | |
| 33-36 | | | | |
| 37-40 | RRH-ID | | | |
| 41-44 | MIC | | | |
| 45-48 | | | | |

FIG. 22

Serial_Number_ONU MESSAGE

| Octet | 31-24 | 23-16 | 15-8 | 7-0 |
|---|---|---|---|---|
| 1-4 | ONU-ID | | Message type ID | SeqNo |
| 5-8 | Vendor_ID | | | |
| 9-12 | VSSN | | | |
| 13-16 | Position | | | |
| 17-20 | Correlation tag | | Current downstream PON-ID | |
| 21-24 | Current downstream PON-ID | | Current upstream PON-ID | |
| 25-28 | Current upstream PON-ID | | SN digest | |
| 29-32 | SN digest | | | |
| 33-36 | SN digest | | Tuning granularity | Step tuning time |
| 37-40 | Upstream line rate capability | Attenuation | Power levelling capability | Padding |
| 41-44 | MIC | | | |
| 45-48 | | | | |

TRANSMISSION DEVICE, OPTICAL TERMINATION DEVICE, TRANSMISSION SYSTEM, AND TRANSMISSION METHOD

CROSS-REFERENCE TO RELATED APPLICATION

This application is based upon and claims the benefit of priority of the prior Japanese Patent Application No. 2018-152219, filed on Aug. 13, 2018, the entire contents of which are incorporated herein by reference.

FIELD

The embodiments discussed herein relate to a transmission device, an optical termination device, a transmission system, and a transmission method.

BACKGROUND

With the spread of mobile terminals such as smartphones the traffic between a base station that couples a mobile terminal to a wireless communication network and an exchange office is increasing. It is examined to dispose a base band unit (BBU) in an exchange, office and dispose a remote radio head (RRH) in each base station such that the traffic of a mobile front hall of the RRHs is accommodated on a passive optical network (PON) having a large transmission capacity. The BBU and each RRH are coupled to each other through an optical line termination (OLT) and an optical network unit (ONU) in the PON.

As the PON applied to the mobile front hall, for example, there is "next generation (NG)-PON2" that uses wavelength division multiplexing (WDM). It is to be noted that "NG-PON2" is prescribed in international telecommunication union telecommunication standardization sector (ITU-T) Recommendation G.989 series.

Examples of the related art include Japanese Laid-open Patent Publication No. 2014-165614 and Japanese Laid-open Patent Publication No. 2014-110574.

The RRH is disposed in a small cell base station having a cover area smaller than that of an ordinary base station, and a large number of small cell base stations are provided in an ordinary macro cell to increase the transmission capacity of the mobile front hall. However, if all small cell base stations operate, there is the possibility that the power consumption may become excessive, and therefore, small cell base stations whose traffic is low are controlled so as to be placed into a sleep state in which the power consumption is low.

On the other hand since a great bandwidth is required for a small cell base station having high traffic, to the ONU coupled to the RRH of the small cell base station, a channel of point-to-point (PtP) WDM prescribed as a function of "NG-PON2" is allocated upon activation from the OLT. Consequently, since the OLT and the ONU communicate one to one, the RRH may communicate with the BBU occupying the bandwidth of the channel.

However, in the case where a plurality of ONUs remain in a non-activated state in the PON, the OLT activates only the ONU from which a registration request is received earliest, and therefore, it sometimes activate an ONU other than the ONU coupled to the RRH of the communication destination of the BBU. In this case, the ONU coupled to the RRH of the communication destination remains un-activated, and no link is established between the ONU and the OLT. Accordingly, since the BBU fails to communicate with the RRH, there is the possibility that hindrance in provision of a communication service may be caused.

Taking the foregoing into consideration, it is desirable to provide a transmission device, an optical termination device, a transmission system, and a transmission method that make communication between a BBU and an RRH corresponding to each other possible.

SUMMARY

According to an aspect of the embodiment, a transmission device coupled to a passive optical network together with a plurality of optical termination devices individually coupled to a plurality of remote radio heads, the transmission device includes an interface configured to acquire, from a base band unit having a communication destination that is one of the plurality of remote radio heads, communication destination information relating to the remote radio head of the communication destination, a receiver configured to receive signals of given wavelength from the plurality of optical termination devices, and a transmitter configured to transmit a first signal that includes wavelength information indicative of the given wavelength and the communication destination information to the plurality of optical termination devices, wherein, when the receiver receives, from an optical termination device of the remote radio head of the communication destination from among the plurality of optical termination devices, a second signal of the given wavelength according to the first signal, the receiver sets, between the receiver and the optical termination device, a relay path that relays communication between the base band unit and the remote radio head of the communication destination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a view depicting an example of a combination in communication between a BBU and a small cell in a normal state and an abnormal state;

FIG. 9 is a view depicting an example of a "Channel_Profile" message including wavelength information and an RRH-ID;

FIG.

FIG. 22 is a view depicting an example of a "Serial_Number_ONU" message including position information.

DESCRIPTION OF EMBODIMENTS

Figure 1:
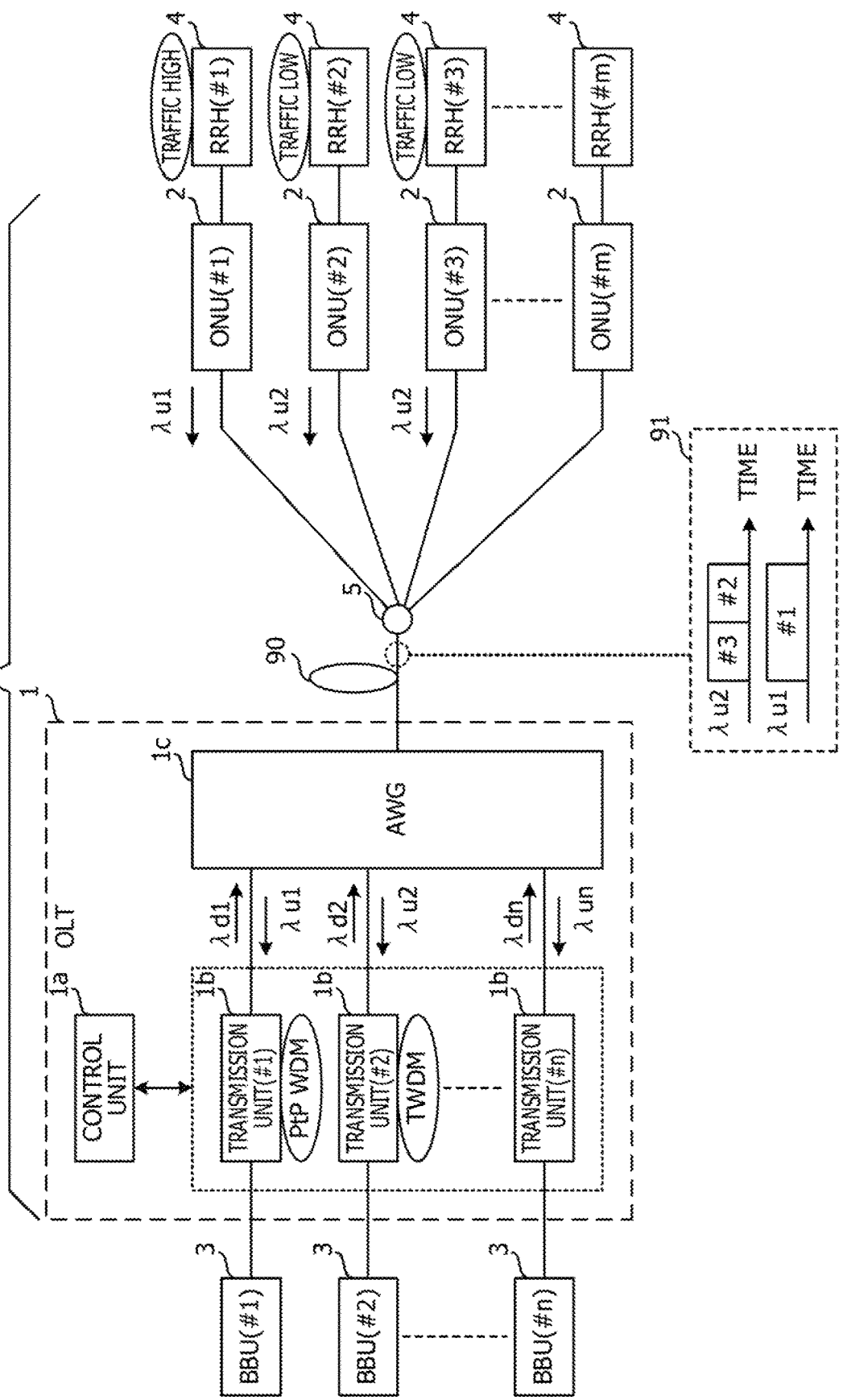
FIG. 1 is a block diagram depicting an example of a transmission system.

FIG. 1 is a block diagram depicting an example of a transmission system. The transmission system includes a plurality of BBUs (#1 to #n (n: positive integer)) 3, a PON 9, and a plurality of RRHs (#1 to #m (m: positive integer)) 4. The BBUs 3 and the RRHs 4 are coupled to each other through the PON 9, and the PON 9 is included in a mobile front hall of a wireless communication network.

Although, as the PON 9, "NG-PON2" prescribed in the ITU-T Recommendation G.989 series is applicable as an example, this is not restrictive. To the PON 9, an OLT 1 and a plurality of ONUs (#1 to #m) 2 are coupled. The OLT 1 includes a control unit 1a a plurality of transmission units (#1 to #n) 1b, and an arrayed waveguide grating (AWG) 1c. It is to be noted that each transmission unit 1b is an example of a transmission device and an optical terminal device, and each ONU 2 is an example of an optical termination device.

Each transmission unit 1b is coupled to the AWG is by an optical fiber or the like. The AWG 1c is coupled to each ONU 2 through a transmission line 90 such as an optical fiber. The transmission line 90 is branched by an optical splitter (optical coupler) 5 and an ONU 2 is coupled to an end of each branch. The ONUs (#1 to #m) 2 are coupled to the RRHs (#1 to #m) 4, respectively, and the transmission units (#1 to #n) 1b are coupled to the BBUs (#1 to #n) 3, respectively. Therefore, each BBU 3 may communicate with each RRH 4 through a relay path provided in the PON 9.

Each transmission unit, 1b transmits and receives an optical signal to and from at least one ONU 2 selected from the ONUs (#1 to #m) 2. It is to be noted that the transmission direction from a transmission unit 1b to an ONU 2 is represented as down "direction," and the transmission direction from an ONU 2 toward a transmission unit 1b is represented as "up direction." Further, an optical signal in the down direction is represented as "down signal," and an optical signal in the up direction is represented as "up signal".

The transmission units (#1 to #n) 1b transmit down signals of individual wavelengths $\lambda d1$ to $\lambda dn$ to the ONUs 2 and receive up signals of individual wavelengths $\lambda u1$ to $\lambda un$ from the ONUs 2. Each ONU 2 detects, during inputting of a down signal from a transmission unit 1b, a wavelength $\lambda d1$ to $\lambda dn$ (hereinafter referred to as "down wavelength") of a down signal by changing the transmission wavelength that passes a wavelength filter in the preceding stage to the receiver, for example, a wavelength that may be received by the ONU 2 (such changing is hereinafter represented as "sweep").

Further, each ONU 2 sets a wavelength $\lambda u1$ to $\lambda un$ designated by a message of a down signal as a wavelength of an up signal (hereinafter represented as "up wavelength") to a transmitter. The AWG 1c has a fixed relationship between wavelengths of and output ports for optical signals. For example, the AWG 1c outputs, from among optical signals in the up direction inputted from the ONUs 2, the optical signal of the wavelength $\lambda u1$ to the transmission unit (#1) 1b; outputs the optical signal of the wavelength $\lambda u2$ to the transmission unit (#2) 1b; and outputs the output signal of the wavelength $\lambda un$ to the transmission unit (#n) 1b. Further, the control unit 1a sets the wavelengths $\lambda d1$ to $\lambda dn$ and the wavelengths $\lambda u1$ to $\lambda un$ to the individual transmission units 1b.

Each transmission unit 1b performs a transmission process in one of operation modes including a PtP WDM mode in which an exclusive band is provided to one ONU 2 and a time and wavelength division multiplexing (TWDM) mode in which a band is shared by a plurality of ONUs 2. An operation mode is determined, for example, in response to the traffic amount for each RRH 4 and set from the control unit 1a to each transmission unit 1b.

In the present example, it is assumed that the traffic amount at the RRH (#1) 4 is great and the traffic amount at the RRH (#2) 4 and the RRH (#3) 4 is small. The ONU (#1) 2 coupled to the RRH 4 (#1) establishes a link to the transmission unit (#1) 1b of the PtP WDM operation mode. Further, the ONU (#2) 2 and the RRH (#3) 4 coupled to the RRH (#2) 4 and the RRH (#3) 4, respectively, establish a link to the transmission unit (#2) 1b of the TWDM operation mode.

Reference numeral 91 denotes a time chart depicting an example of up signals of the operation modes. "#1" to "#3" represent up signals of the ONUs (#1 to #3) 2, respectively. The ONU (#2) 2 and the ONU (#3) 2 of TWDM transmit up signals of the wavelength $\lambda u2$ time-divisionally to the transmission unit (#2) 1b. Here, to the up signals "#2" and "#3" of the ONU (#2) 2 and the ONU (#3) 2, time slots different from each other are allocated from the transmission unit (#2) 1b such that they do not interfere with each other.

Further, the ONU((#1) 2 of PtP WDM transmits the up signal "#1" of the wavelength $\lambda u1$ to the transmission unit (#1) 1b. Since the ONU (#1) 2 occupies the bandwidth of the wavelength $\lambda u1$, it may transmit a greater amount of traffic than that of the other ONU (#2) 2 and ONU (#3) 2.

However, in the case where a plurality of non-activated ONUs 2 exist, the transmission unit (#1) 1b of PtP WDM activates only the ONU 2 from which it has received a registration request earliest. Therefore, in the case where the ONU (#1) 2 and the ONU (#m) 2 are not activated as yet, if the transmission unit (#1) 1b receives a registration request from the ONU (#m) 2 earlier than the ONU (#1) 2, it activates the ONU (#m) 2 while it leaves the ONU (#1) 2 non-activated.

In this case, a link is not established between the transmission unit (#1) 1b and the ONU (#1) 2. Accordingly, since the BBU (#1) 3 fails to communicate with the RRH (#1) 4 of the communication destination, there is the possibility that a trouble may occur in provision of a communication service. It is to be noted that the RRH 4 of the communication destination inset to each BBU 3, for example, from a management apparatus of the wireless communication network.

In the following, description is given taking an example of an activation sequence of an ONU 2. In the following example, it is assumed that the communication destination of the BBU (#1) 3 is the RRH (#1) 4 and the communication destination of the BBU (#n) 3 is the RRH (#m) 4.

Figure 2:
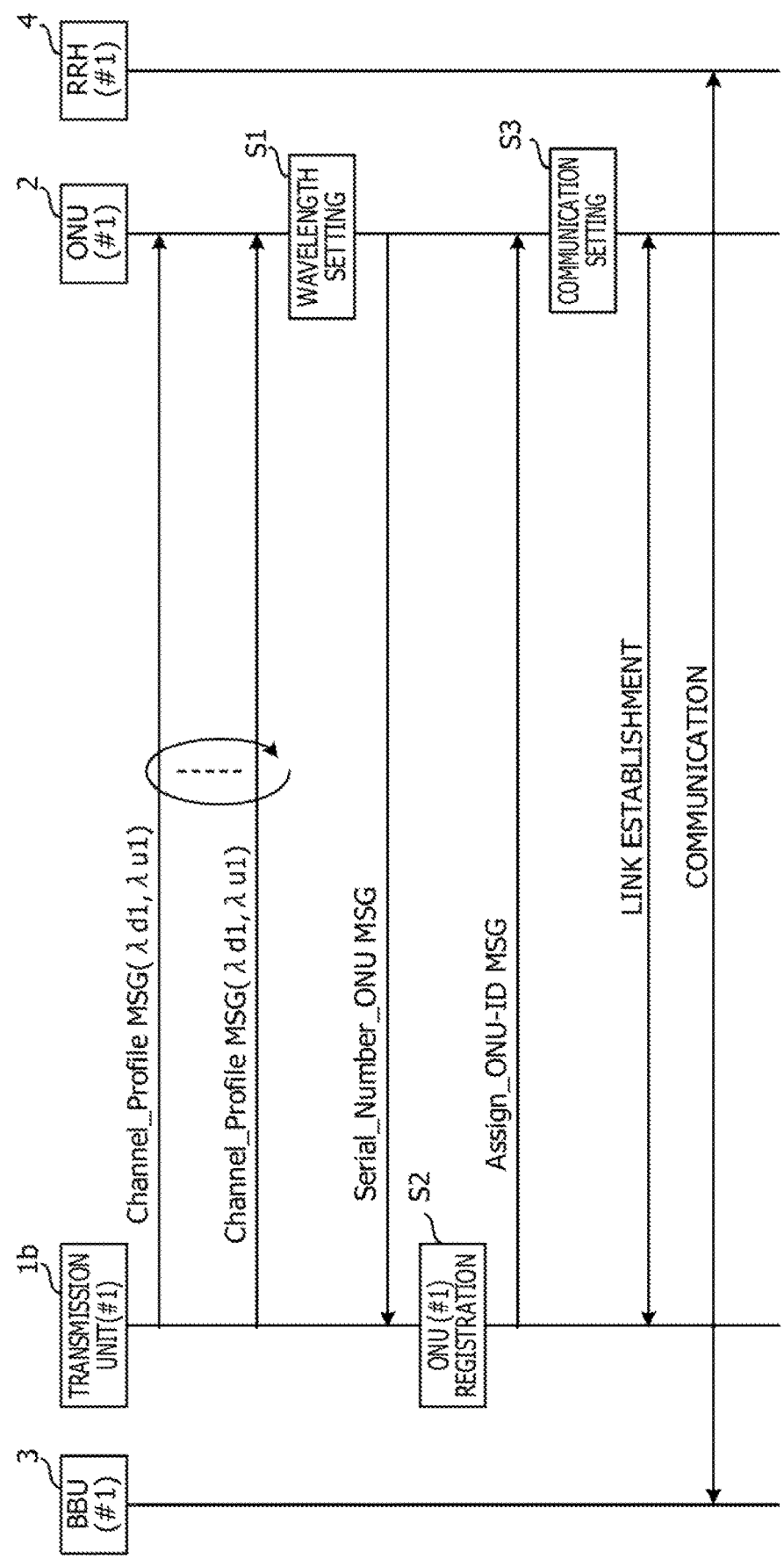
FIG. 2 is a sequence diagram depicting a process (in a normal state) for establishing a link between a transmission unit and an ONU in a comparative example.

FIG. 2 is a sequence diagram depicting a process (in a normal case) for establishing a link between a transmission unit 1b and an ONU 2 in the comparative example. In the present example, it is assumed that, from among the ONUs (#1 to #m) 2, only the ONU (#1) 2 is not activated as yet. In the activation sequence, between the transmission unit (#1) 1b and the ONU (#1) 2, various messages are transferred as control signals different from a main signal. It is to be noted that the main signal has, for example, a fixed idle pattern until after a link is established between the transmission unit 1b and the ONU 2.

The transmission unit (#1) 1b regularly transmits a "Channel_Profile" message (MSG) prescribed in ITU-T Recommendation G.989.3. The "Channel_Profile" message includes the down wavelength λd1 and the up wavelength λu1.

The ONU (#1) 2 sweeps the transmission wavelength of the wavelength filter to detect and set the down wavelength λd1 to the wavelength filter and sets the up wavelength λu1 designated in the received "Channel_Profile" message to the transmitter (S1). The ONU (#1) 2 transmits a "Serial_Number_ONU" message prescribed in ITU-T Recommendation G.989.3 to the transmission unit (#1) 1b in response to the "Channel_Profile" message. The "Serial_Number_ONU" message is an example of a registration request from an ONU 2 to a transmission unit 1b.

The transmission unit (#1) 1b registers the ONU (#1) 2 into an activation list in response to the "Serial_Number_ONU" message (S2). The transmission unit (#1) 1b transmits an "Assign_ONU-ID" message to the ONU (#1) 2 in order to allocate an ONU-ID to the ONU (#1) 2. The ONU-ID is an identifier of the ONU (#1) 2 in the PON 9 used in practical use.

The ONU (#1) 2 performs setting (hereinafter referred to as "communication setting") required for communication with the transmission unit (#1) 1b in response to the "Assign_ONU-ID" (S3). At this time, the ONU-ID and so forth included in the "Assign_ONU-ID" message are set. A link is established between the transmission unit (#1) 1b and the ONU (#1) 2 thereby.

After the link is established between the transmission unit (#1) 1b and the ONU (#1) 2, since ordinary transfer of a main signal becomes possible in the up direction and the down direction, a relay path that relays communication between the BBU (#1) 3 and the RRH (#1) 4 of the communication destination is set. Consequently, the BBU (#1) 3 may communicate with the RRH (#1) 4 of the communication destination through the transmission unit (#1) 1b and the ONU (#1) 2.

However, in the case where a plurality of non-activated ONUs (#1 and #m) 2 exist, the BBU (#1) 3 sometimes fails to communicate with the RRH (#1) 4 of the communication destination.

Figure 3:
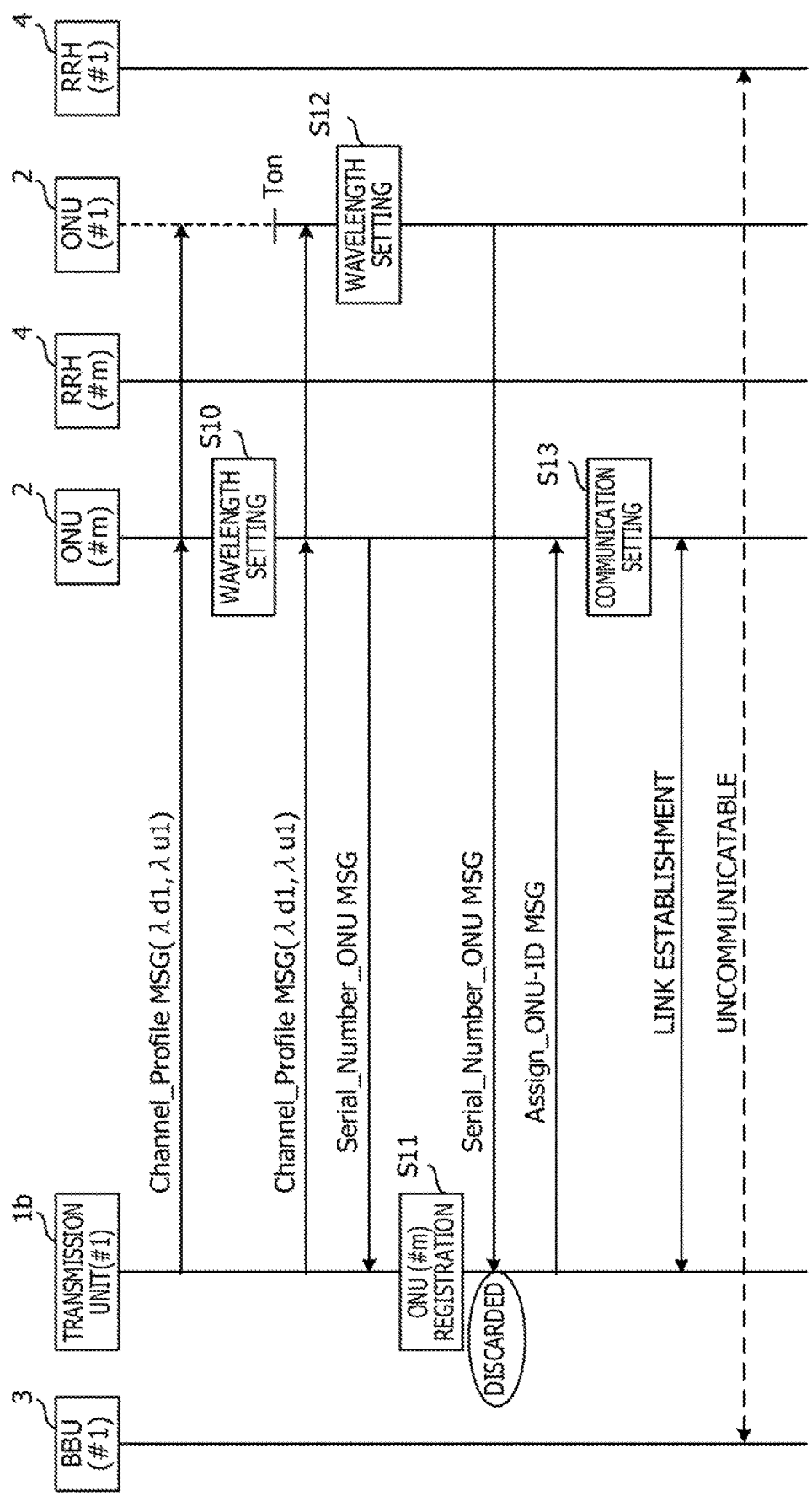
FIG. 3 is a sequence diagram depicting a process (in an abnormal state) for establishing a link between a transmission unit and an ONU in a comparative example.

FIG. 3 is a sequence diagram depicting a process (in an abnormal state) for establishing a link between a transmission unit 1b and an ONU 2 in the comparative example. In the present example, it is assumed that, among the ONUs (#1 to #m) 2, only the ONU (#1) 2 and the ONU (#m) 2 are in a non-activated state. Further, since the power is turned on to the ONU (#1) 2 at time Ton later than the ONU (#m) 2, it is assumed that the ONU (#1) 2 receives a message transmitted from the transmission unit (#1) 1b after time Ton.

The ONU (#m) 2 sets the up wavelength λu1 in response to a first "Channel_Profile" message (S10). Further, the ONU (#1) 2 sets the up wavelength λu1 in response to a "Channel_Profile" message after time Ton (S12).

The ONU (#m) 2 transmits a "Serial_Number_ONU" message earlier than the ONU (#1) 2, to which the power is not on as yet, in response to the first "Channel_Profile" message. Therefore, the transmission unit (#1) 1b registers the ONU (#m) 2 registers the ONU (#m) 2 in response to the "Serial_Number_ONU" message received first (S11). Further, since the transmission unit (#1) 1b discards the "Serial_Number_ONU" message received from the ONU (#1) 2 to which the power is turned on later, it does not register the ONU (#1) 2.

Accordingly, the transmission unit (#1) 1b transmits an "Assign_ONU-ID" message prescribed by ITU-T Recommendation G.989.3 to the ONU (#m) 2. The "Assign_ONU-ID" message is an example of an activation instruction from the transmission unit (#1) 1b to the ONU (#m) 2. The ONU (#m) 2 performs setting required for communication with the transmission unit (#1) 1b in response to the "Assign ONU-ID" message (S13). Consequently, a link is established between the transmission unit (#1) 1b and the ONU (#m) 2.

Accordingly, even if the BBU (#1) 3 may communicate with the RRH (#m), which is not a communication destination, through the transmission unit (#1) 1b and the ONU (#m), it fails to communicate with the RRH (#1) 4 of the communication destination because it does not have a relay path in the PON 9. It is to be noted that, although the present example is a case in which a difference in reception timing of the "Serial_Number_ONU" message arises from a difference in time Ton of the turning on of power between the ONU (#1) 2 and the ONU (#m) 2, a case possibly occurs in which, even if time Ton of the turning on of power is substantially same between the ONU (#1) 2 and the ONU (#m) 2, a difference in reception timing arises from a difference in transmission distance between the optical coupler 5 and the ONUs (#m, #1) 2.

In this manner, in the case where a plurality of non-activated ONUs 2 exist, since a BBU 3 sometimes fails to communicate with an RRH 4 of a communication destination, the combination of a BBU 3 and an RRH 4 is likely to be replaced as described below.

FIG. 4 is a view depicting examples of a combination of communication between a BBU 3 and small cells SC#1 to SC#16 in a normal state and an abnormal state. In FIG. 4, like components to those of FIG. 1 are denoted by like reference characters and overlapping description of them is omitted.

The small cells SC#1 to SC#16 represent a cover area of small cell base stations in which an ONU 2 and an RRH 4 are installed. In the present example, it is assumed that the RRH 4 of the communication destination of the BBU (#1) 3 is disposed in the small cell SC#3 and the RRH 4 of the communication destination of the BBU (#4) 3 is disposed in the small cell SC#13.

Reference character Ga represents combinations of communication in a normal state. As indicated by broken lines, the BBU (#1) 3 communicates with the RRH 4 in the small cell SC#3 and the BBU (#4) 3 communicates with the RRH 4 in the small cell SC#3.

Reference character Gb represents combinations of communication in an abnormal state. As indicated by broken lines, the BBU (#1) 3 communicates with the RRH 4 in the small cell SC#13 and the BBU (#4) 3 communicates with the RRH 4 in the small cell SC#13. For example, the RRHs 4 of the communication destination change places between the BBU (#1) 3 and the BBU (#4) 3.

Such change may take place from that, for example, the transmission unit (#1) 1b links to the ONU 2 in the small cell SC#13 earlier than the ONU 2 in the small cell SC#3 and the transmission unit (#4) 1b links to the ONU 2 in the remaining small cell SC#3.

Therefore, the transmission unit (#1) 1b and the ONU 2 in the embodiment cooperate with the BBU 3 and the RRH 4, respectively, to establish a link such that the BBU 3 may communicate with the RRH 4 of the communication destination.

Figure 5:
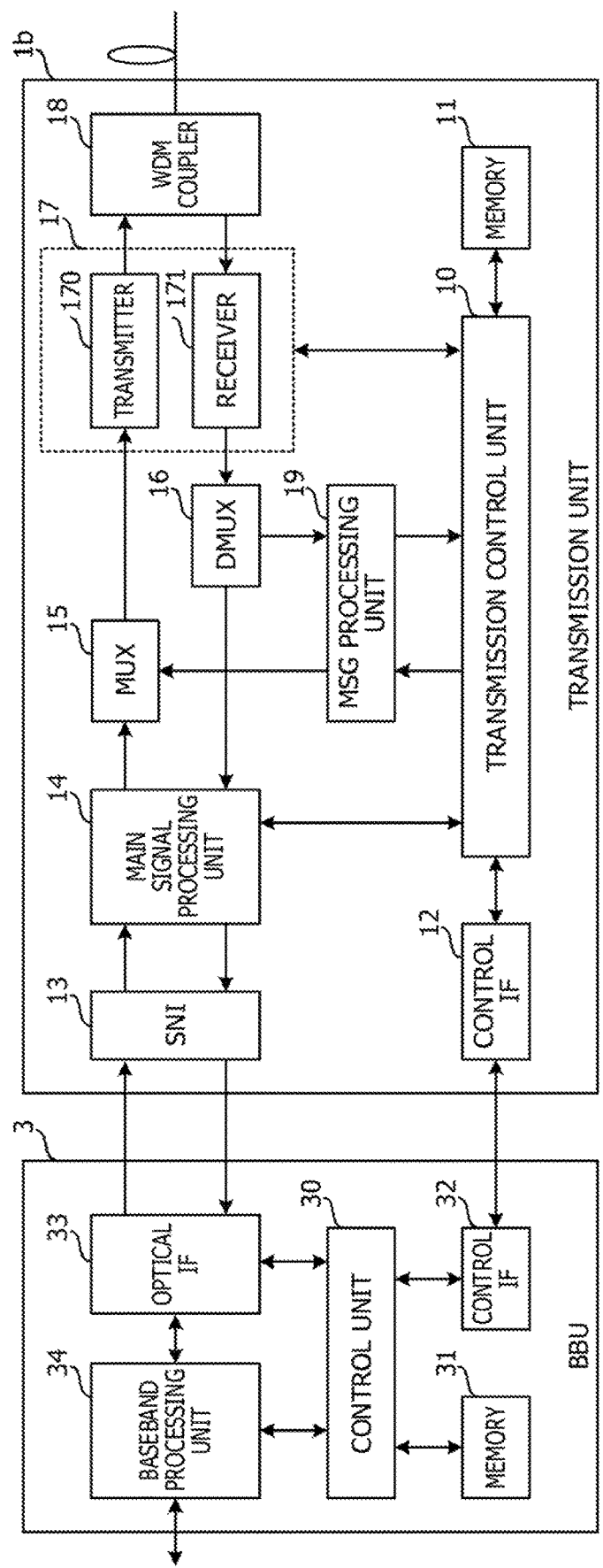
FIG. 5 is a block diagram depicting an example of a BBU and a transmission unit.

FIG. 5 is a block diagram depicting an example of a BBU 3 and a transmission unit 1b. The BBU 3 includes a control unit 30, a memory 31, a control interface (control IF) unit 32, an optical interface (optical IF) unit 33, and a baseband processing unit 34. Meanwhile, the transmission unit 1b includes a transmission control unit 10, a memory 11, a control interface (control IF) unit 12, an application server-network interface (SNI) unit 13, a main signal processing unit 14, a multiplexing unit (MUX) 15, a demultiplexing unit (DMUX) 16, an optical module 17, a WDM coupler 18, and a message (MSG) processing unit 19.

In the BBU 3, the baseband processing unit 34 processes a baseband signal inputted from and to be outputted to a wireless communication network not depicted. The baseband processing unit 34 outputs a baseband signal from the wireless communication network to the optical IF unit 33 and outputs a baseband signal from the optical IF unit 33 to the wireless communication network.

The optical IF unit 33 converts a baseband signal from the baseband processing unit 34 into an optical signal and transmits the optical signal to the SNI unit 13. Further, the optical IF unit 33 converts an optical signal from the SNI unit 13 into an electric baseband signal and transmits the baseband signal to the baseband processing unit 34.

The control unit 30 controls the transmission process of the baseband processing unit 34 and the optical IF unit 33. Further, the control unit 30 communicates with the control IF unit 12 of the transmission unit 1b through the control IF unit 32.

The memory 31 is coupled to the control unit 30. Into the memory 31, RRH-IDs (#1 to #m) for identifying the RRHs 4 are stored as an example of communication destination information relating to the communication destination of the BBU 3. It is to be noted that an RRH-ID is an example of identification information. An RRH-ID is acquired, for example, from control information of the wireless communication network by the control unit 30 and written into the memory 31. The control unit 30 reads out an RRH-ID from the memory 31 in an activation sequence and transmits the RRH-ID from the control IF unit 32 to the transmission unit 1b.

It is to be noted that the baseband processing unit 34 and the control IF unit 32 are circuits configured from hardware, for example, of a field programmable gate array (FPGA) or an application specified integrated circuit (ASIC). Further, the control unit 30 is a circuit configured from hardware including a circuit including a processor such as a central processing unit (CPU), an EFGA, or an ASIC. The optical IF unit 33 includes a circuit used for transmission and reception of an optical signal such as a laser diode or a photodetector.

Further, in the transmission unit 1b, the SNI unit 13 transmits and receives a baseband signal to and from the optical IF unit 33. The SNI unit 13 converts a baseband signal from the main signal processing unit 14 into an optical signal and transmits the optical signal to the optical IF unit 33. Further, the SNI unit 13 converts an optical signal from the optical IF unit 33 into an electric baseband signal and transmits the baseband signal to the main signal processing unit 14.

The main signal processing unit 14 performs a process for transmitting a baseband signal as a main signal in the PON 9. The main signal processing unit 14 accommodates a baseband signal inputted from the SNI unit 13 into an Ethernet (registered trademark, similar also in the following description) signal and outputs the Ethernet signal to the multiplexing unit 15. Further, the main signal processing unit 14 acquires a baseband signal from the Ethernet signal inputted form the demultiplexing unit 16 and outputs the baseband signal to the SNI unit 13. It is to be noted that, although the Ethernet signal is an example of the format of an up signal and a down signal in the PON 9, a different format may be used instead.

The multiplexing unit 15 multiplexes a control signal into a main signal. For example, the multiplexing unit 15 inserts a message inputted from the MSG processing unit 19 as a control signal, for example, at fixed time intervals into a down signal inputted from the main signal processing unit 14. The multiplexing unit 15 outputs the multiplexed down signal to the optical module 17.

The demultiplexing unit 16 demultiplexes the control signal from the main signal. For example, the demultiplexing unit 16 demultiplexes the message as the control signal from the up signal inputted from the optical module 17 and outputs the control signal to the MSG processing unit 19. The demultiplexing unit 16 outputs the up signal after the demultiplexing to the main signal processing unit 14.

The optical module 17 includes a transmitter 170 that transmits an optical signal and a receiver 171 that receives an optical signal. The transmitter 170 performs electrical-to-optical conversion of the down signal from the multiplexing unit 15 and outputs a resulting optical signal to the WDM coupler 18. The receiver 171 performs optical-to-electrical conversion of the up signal and outputs a resulting electric signal to the demultiplexing unit 16.

The wavelength of an optical signal to be transmitted from the transmitter 170 (down wavelength $\lambda d1, \ldots, \lambda dn$) and the wavelength of an optical signal to be received by the receiver 171 (up wavelength $\lambda u1, \ldots, \lambda un$) are set from the transmission control unit 10 to the transmitter 170 and the receiver 171, respectively. It is to be noted that the receiver 171 is an example of a reception unit.

The WDM coupler 18 introduces a down signal from the transmitter 170 to the AWG 1c. Meanwhile, the WDM coupler 18 introduces an up signal from the AWG 1c to the receiver 171. With the WDM coupler 18, the transmission unit 1b may transmit and receive an optical signal by a single core optical fiber.

The transmission control unit 10 controls the transmission process of a down signal and an up signal for the main signal processing unit 14. Further, the transmission control unit 10 instructs the MSG processing unit 19 to create and transmit a message and receives a message from the MSG processing unit 19. It is to be noted that, as the message, for example, there are a "Channel_Profile" message, a "Serial_Number_ONU" message, and an "Assign_ONU-ID" message.

Further, the memory 11 is coupled to the transmission control unit 10 and stores various kinds of control information such as an activation list of the ONUs 2. The transmission control unit 10 communicates with the control unit 30 of the BBU 3 through the control IF unit 12. The transmission control unit 10 receives and stores an RRH-ID from the control unit 30 into the memory 11. At this time, the control IF unit 12 acquires an RRH-ID from the BBU 3 as an example of an acquisition unit.

Further, the transmission control unit 10 acquires wavelength information indicative of the down wavelengths $\lambda d1, \ldots, \lambda dn$ and the up wavelengths $\lambda u1, \ldots, \lambda un$ from the control unit 1a. The transmission control unit 10 stores the wavelength information into the memory 11 and sets the down wavelengths $\lambda d1, \ldots, \lambda dn$ and the up wavelengths $\lambda u1, \ldots, \lambda un$ to the optical module 17 based on the wavelength information.

The transmission control unit 10 instructs the MSG processing unit 19 to create a "Channel_Profile" message including the wavelength information and the RRH-ID. The MSG processing unit 19 creates and outputs a "Channel_Profile" message to the multiplexing unit 15. The "Channel_Profile" message is inserted into the down signal by the multiplexing unit 15 and transmitted from the transmitter 170 to the ONUs 2. It is to be noted that the transmitter 170 is an example of a transmission unit and the "Channel_Profile" message is an example of a first signal.

Further, the transmission control unit 10 receives a "Serial_Number_ONU" message from the MSG processing unit 19 in response to the transmission of the "Channel_Profile" message. The transmission control unit 10 registers, from among the plurality of ONUs 2, the ONU 2 of the transmission source of the "Serial_Number_ONU" message received earliest into the activation list. It is to be noted that the activation list is stored in the memory 11 and has registered therein each ONU 2 that is in an activated state.

The transmission control unit 10 instructs the MSG processing unit 19 to create an "Assign_ONU-ID" message in response to reception of the "Serial_Number_ONU" message. The "Assign_ONU-ID" message is transmitted from the transmitter 170 to the ONU 2. It is to be noted that the "Serial_Number_ONU" message is an example of a second signal, and the "Assign_ONU-ID" message is an example of a third signal.

Consequently, a link between the ONU 2 and the transmission unit 1b is established. The transmission control unit 10 establishes a link by instructing the MSG processing unit 19 to transmit a given message. The ONU 2 of the target of establishment of a link is the RRH 4 of the communication destination of the BBU 3 based on the RRH-ID included in the "Channel_Profile" message. It is to be noted that a link establishment process is hereinafter described.

It is to be noted that the main signal processing unit 14, the SNI unit 13, the multiplexing unit 15, the demultiplexing unit 16, the MSG processing unit 19, and the control IF unit 12 are circuits configured from hardware such as an FPGA or an ASIC. Further, the transmission control unit 10 is a circuit configured from hardware such as a circuit including a processor such as a CPU, an FPGA, or an ASIC. The transmitter 170 includes such circuits as, for example, a laser diode and a modulator and the receiver 171 includes such circuits as a photodetector or a demodulator.

Figure 6:
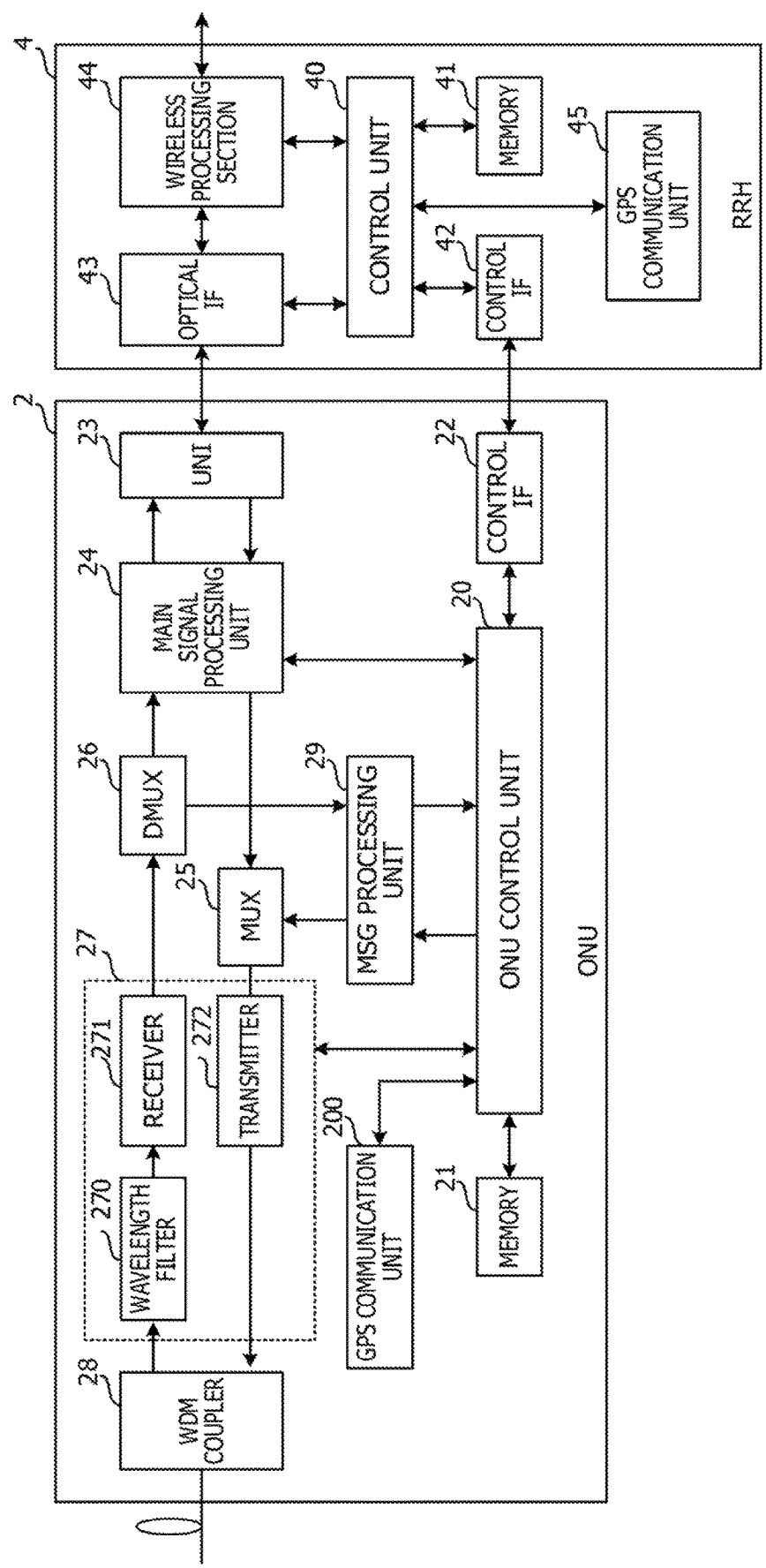
FIG. 6 is a block diagram depicting an example an ONU and an RRH.

FIG. 6 is a block diagram depicting an example of an ONU 2 and an RRH 4. The ONU 2 includes an ONU control unit 20, a memory 21, a control IF unit 22, a user network interface (UNI) unit 23, a main signal processing unit 24, a multiplexing unit 25, a demultiplexing unit 26, an optical module 27, a WDM coupler 28, an MSG processing unit 29, and a global positioning system (GPS) communication unit 200. The RRH 4 includes a control unit 40, a memory 41, a control IF unit 42, an optical IF unit 43, a wireless processing unit 44, and a GPS communication unit 45.

In the RRH 4, the wireless processing unit 44 processes wireless communication with a mobile terminal such as a smartphone. The wireless processing unit 44 converts a baseband signal inputted from the optical IF unit 43 into a radio frequency (RF) signal of a given radio frequency and transmits the RF signal to the mobile terminal. Further, the wireless processing unit 44 converts an RF signal from the mobile terminal into a baseband signal and outputs the baseband signal to the optical IF unit 43.

The optical IF unit 43 converts a baseband signal from the wireless processing unit 44 into an optical signal and outputs the optical signal to the UNI unit 23. Further, the optical IF unit 43 converts an optical signal from the UNI unit 23 into an electric baseband signal and transmits the baseband signal to the wireless processing unit 44.

The control unit 40 controls a transmission process of the wireless processing unit 44 and the optical IF unit 43. Further, the control unit 40 communicates with the control IF unit 22 of the ONU 2 through the control IF unit 42.

The memory 41 is coupled to the control unit 40. Into the memory 41, RRH-IDs (#1 to #m) for identifying the RRHs 4 are stored. The RRH-IDs are written into the memory 41 through the control unit 40 from a terminal (not depicted) upon installation. The control unit 40 reads out an RRH-ID from the memory 41 and transmits the RRH-ID from the control IF unit 42 to the ONU 2 in the activation sequence.

The GPS communication unit 45 acquires position information of the latitude and the longitude of the installation position of the RRH 4 by a GPS function. The control unit 40 acquires the position information from the GPS communication unit 45. The GPS communication unit 45 may be provided only in a case in which the position information of the ONU 2 is used for decision of a link establishment process as hereinafter described.

It is to be noted that the wireless processing unit 44 and the GPS communication unit 45 are a circuit configured from hardware such as an antenna circuit and an FPGA or an ASIC. The control IF unit 42 is a circuit configured from hardware such as an FPGA or an ASIC. Further, the control unit 40 is a circuit configured from hardware such as a circuit including a processor such as a CPU, an FPGA, or an ASIC. The optical IF unit 43 includes a circuit that is used for transmission and reception of an optical signal such as a laser diode or a photodetector.

In the ONU 2, the UNI unit 23 transmits and receives a baseband signal to and from the optical IF unit 43. The UNI unit 23 converts a baseband signal from the main signal processing unit 24 into an optical signal and transmits the optical signal to the optical IF unit 43. Further, the UNI unit 23 converts an optical signal from the optical IF unit 43 into an electric baseband signal and transmits the baseband signal to the main signal processing unit 24.

The main signal processing unit 24 performs a process for transmitting a baseband signal as a main signal in the PON 9. The main signal processing unit 24 accommodates a baseband signal inputted from the UNI unit 23 into an Ethernet signal and outputs the Ethernet signal to the multiplexing unit 25. Further, the main signal processing unit 24 acquires a baseband signal from an Ethernet signal inputted from the demultiplexing unit 26 and outputs the baseband signal to the UNI unit 23.

The multiplexing unit 25 multiplexes a control signal into a main signal. For example, the multiplexing unit 25 inserts a message inputted from the MSG processing unit 29 as a control signal, for example, at fixed time intervals into an up signal inputted from the main signal processing unit 24. The multiplexing unit 25 outputs the multiplexed up signal to the optical module 27.

The demultiplexing unit 26 demultiplexes the control signal from the main signal. For example, the demultiplexing unit 26 demultiplexes a message as a control signal from a down signal inputted from the optical module 27 and outputs the control signal to the MSG processing unit 29. The demultiplexing unit 26 outputs the down signal after the demultiplexing to the main signal processing unit 24.

The optical module 27 includes a transmitter 272 that transmits an optical signal, a wavelength filter 270 that performs filtering of a wavelength of an optical signal, and a receiver 271 that receives an optical signal. The transmitter 272 performs electrical-to-optical conversion of an up signal from the multiplexing unit 25 and outputs a resulting signal to the WDM coupler 28. The transmitter 272 transmits an optical signal of an up wavelength $\lambda u1, \lambda u2, \ldots, \lambda un$ set from the ONU control unit 20 as an up signal. It is to be noted that the transmitter 272 is an example of a signal transmission unit, and the receiver 271 is an example of a signal reception unit.

The wavelength filter 270 passes an optical signal of a down wavelength $\lambda d1, \lambda d2, \ldots, \lambda dn$ set from the ONU control unit 20 from among optical signals inputted from the WDM coupler 28 and outputs the optical signal as a down signal to the receiver 271. The receiver 271 performs optical-to-electrical conversion of the down signal and outputs a resulting signal to the demultiplexing unit 26.

The WDM coupler 28 introduces an up signal from the transmitter 272 to the transmission line 90. Further, the WDM coupler 28 introduces a down signal from the transmission line 90 to the wavelength filter 270. With the WDM coupler 28, the ONU 2 may transmit and receive an optical signal by a single-core optical fiber.

The ONU control unit 20 controls a transmission process of a down signal and an up signal for the main signal processing unit 24. Further, the ONU control unit 20 instructs the MSG processing unit 29 to create and transmit a message and receives a message from the MSG processing unit 29.

The memory 21 is coupled to the ONU control unit 20 and stores various kinds of control information. The ONU control unit 20 communicates with the control unit 40 of the RRH 4 through the control IF unit 22. The ONU control unit 20 receives and stores an RRH-ID from the control unit 40 into the memory 21.

The ONU control unit 20 receives a "Channel_Profile" message from the MSG processing unit 19 and acquires wavelength information from the "Channel_Profile" message. The ONU control unit 20 stores the wavelength information into the memory 21. The ONU control unit 20 sets an up wavelength $\lambda u1, \lambda u2, \ldots, \lambda un$ to the transmitter 272 based on the wavelength information.

Further, the ONU control unit 20 acquires the RRH-ID from the "Channel_Profile" message and compares the RRH-ID with the RRH-ID in the memory 21. In the case where a result of the comparison reveals that the RRH-IDs coincide with each other, the ONU control unit 20 instructs the MSG processing unit 29 to create a "Serial_Number_ONU" message. The MSG processing unit 29 creates and outputs a "Serial_Number_ONU" message to the multiplexing unit 25. The "Serial_Number_ONU" message is inserted into an up signal by the multiplexing unit 25 and transmitted from the transmitter 272 to the transmission unit 1b.

Further, the ONU control unit 20 receives an "Assign_ONU-ID" message from the MSG processing unit 29 in response to transmission of the "Serial_Number_ONU" message. The ONU control unit 20 acquires the ONU-ID from the "Assign_ONU-ID" message and stores the ONU-ID into the memory 21. Consequently, a link is established between the transmission unit 1b and the ONU 2. The ONU-ID is used in a transmission process between the transmission unit 1b and the ONU 2. It is to be noted that the ONU control unit 20 is an example of a control unit.

In this manner, based on a result of comparison between RRH-IDs, only the ONU 2 coupled to the RRH 4 of the communication destination of the BBU 3 may transmit a "Serial_Number_ONU" message to the transmission unit 1b to establish a link. Therefore, the BBU 3 may communicate with the RRH 4 of the communication destination through the PON 9.

The GPS communication unit 200 is an example of a detection unit that detects the position of the ONU 2. The GPS communication unit 200 acquires position information of the latitude and the longitude or the like of the installation position of the ONU 2 by its GPS function. The ONU control unit 20 acquires the position information from the GPS communication unit 200. The GPS communication unit 200 may be provided only in the case where the position information of the ONU 2 is used for decision of establishment of a link as hereinafter described.

It is to be noted that the main signal processing unit 24, the UNI unit 23, the multiplexing unit 25, the demultiplexing unit 26, the MSG processing unit 29, and the control IF unit 22 are a circuit configured from hardware such as an FPGA or an ASIC. The GPS communication unit 200 is a circuit configured from hardware such as an antenna circuit and an FPGA or an ASIC. Meanwhile, the ONU control unit 20 is a circuit configured from hardware such as a circuit that includes a processor such as a CPU, an FPGA, or an ASIC. The transmitter 272 includes a circuit such as a laser diode, a modulator or the like, and the receiver 271 includes a circuit such as a photodetector a demodulator and so forth.

Now, an example of a sequence for establishing a link is described. It is to be noted that the following sequence is an example of a transmission method between a transmission unit 1b and each ONU 2.

Figure 7:
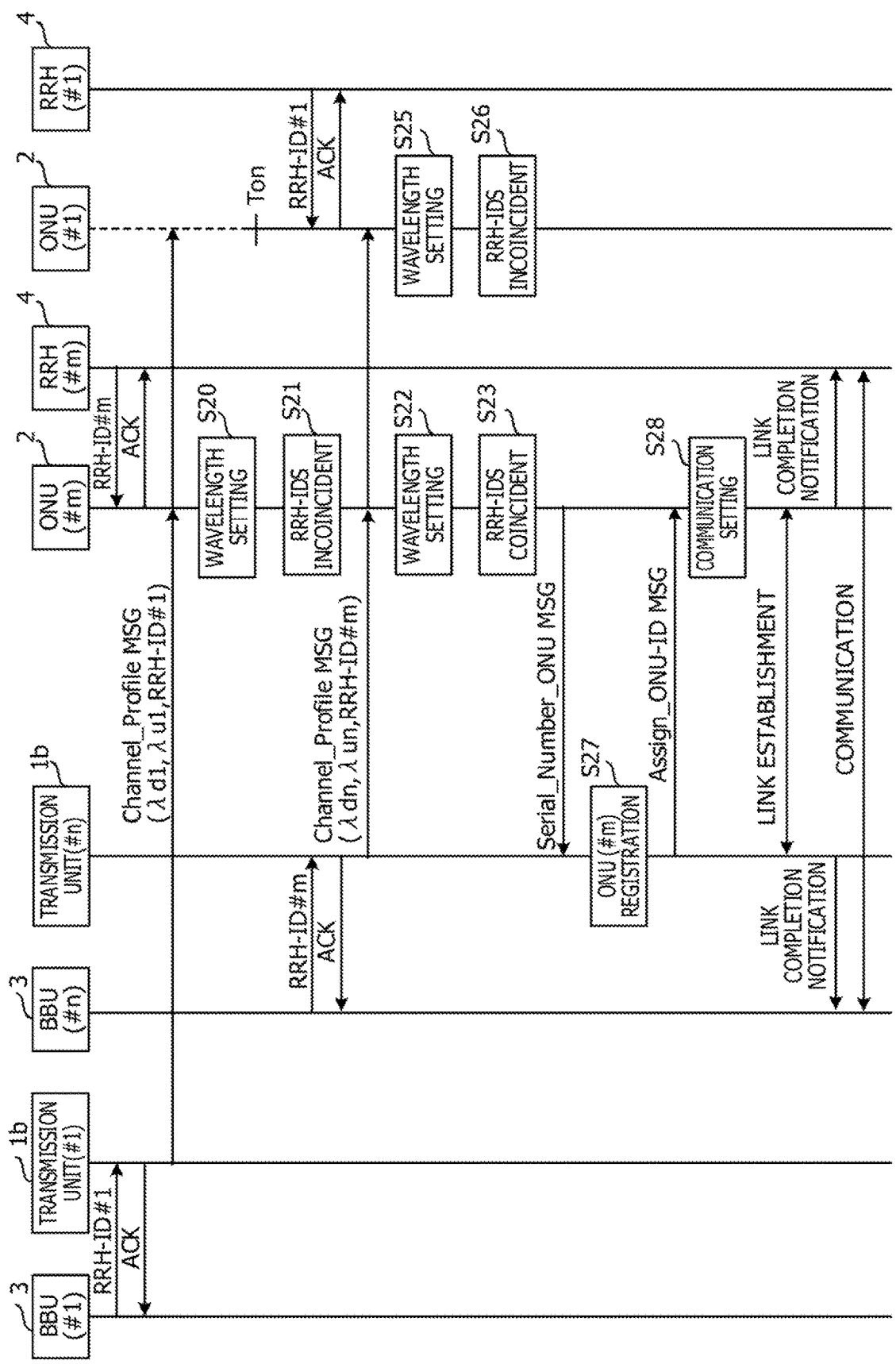
FIG. 7 is a sequence diagram (part 1) depicting an example of processing for establishing a link between a transmission unit and an ONU.
Figure 8:
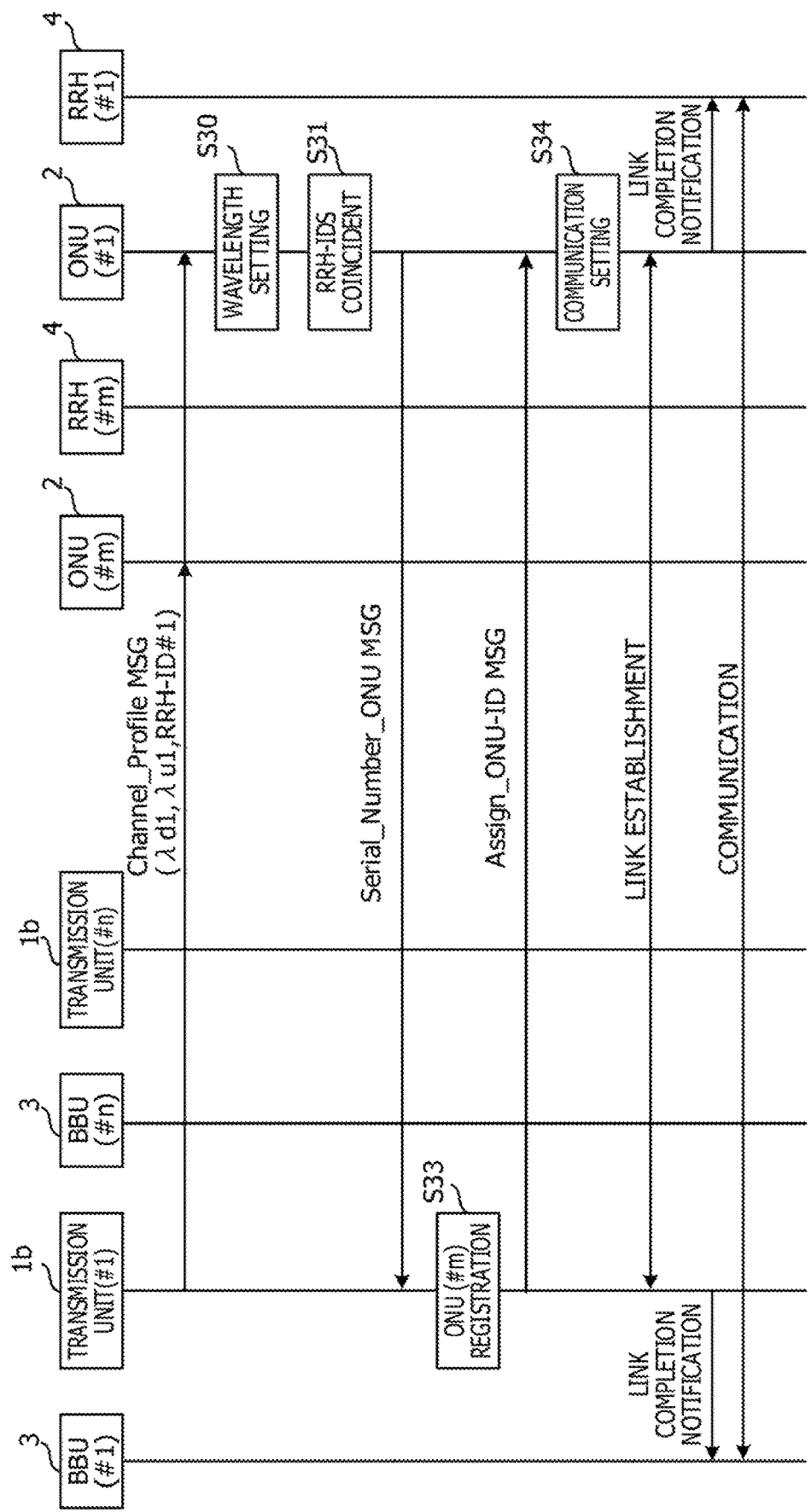
FIG. 8 is a sequence diagram (part 2) depicting an example of a process for establishing a link between a transmission unit and an ONU.

FIGS. 7 and 8 are sequence diagrams depicting an example of a process for establishing a link between a transmission unit 1b and an ONU 2. In the present example, a sequence for establishing a link between two transmission units (#1, #n) 1b of PtP WDM and two non-activated ONUs (#1, #m) 2 is described. However, there is no restriction to the number of transmission units 1b and ONUs 2. Further, it is assumed that, since the power to the ONU (#1) 2 is turned on at time Ton later than the ONU (#m) 2, the ONU (#1) 2 receives a message transmitted from the transmission unit (#1) 1b after the time Ton.

Referring first to FIG. 7, the BBU (#1) 3 notifies the transmission unit (#1) 1b of the RRH-ID #1 and the transmission unit (#1) 1b replies ACK to the BBU (#1) 3. At this time, the control IF unit 12 acquires and outputs the RRH-ID #1 from the BBU (#1) 3 to the transmission control unit 10. It is to be noted that the RRH-ID #1 is stored into the memory 11.

Meanwhile, the RRH (#m) 4 transmits the RRH-ID #m to the ONU (#m) 2, and the ONU (#m) 2 replies ACK to the RRH (#m) 4. At this time, the control IF unit 22 acquires and outputs the RRH-ID #m from the RRH (#m) 3 to the ONU control unit 20. It is to be noted that the RRH-ID #m is stored into the memory 21.

The transmission unit (#1) 1b transmits a "Channel_Profile" message that includes the wavelength information (λd1, λu1) and the RRH-ID #m. At this time, the MSG processing unit 19 creates a "Channel_Profile" message in accordance with an instruction of the transmission control unit 10, and the "Channel_Profile" message is transmitted from the transmitter 170. Although the "Channel_Profile" message is received by the ONU (#m) 2 to which the power is on, it is not received by the ONU (#1) 2 to which the power is not on.

FIG. 9 is a view depicting an example of a "Channel_Profile" message including wavelength information and an RRH-ID. In FIG. 9, each numeral in the vertical direction and the horizontal direction represents the position of each field in the message in octets.

Into a field indicated by a broken line frame, the wavelength information (λd1, λu1) and the RRH-ID #1 are inserted. The down wavelength λd1 is inserted into "Downstream frequency," and the up wavelength λu1 is inserted into "Upstream frequency." Further, the RRH-ID #1 is inserted into the "RRH-ID" field. It is to be noted that contents of the other fields are prescribed in ITU-T Recommendation G.989.3.

Referring again to FIG. 7, the ONU (#m) 2 sweeps the wavelength of the wavelength filter 270 to receive the "Channel_Profile" message by the receiver 271 thereof. At this time, the ONU control unit 20 changes the wavelength of the wavelength filter 270 and sets the wavelength when it receives the "Channel_Profile" message from the MSG processing unit 29 to the wavelength filter 270. It is to be noted that this wavelength coincides with the down wavelength λd1 indicated by the wavelength information in the "Channel_Profile" message.

The ONU control unit 20 acquires the wavelength information and the RRH-ID #1 from the "Channel_Profile" message. The ONU control unit 20 sets the wavelength λu1 indicated by the wavelength information to the transmitter 272 (S20). It is to be noted that the RRH-ID #1 is stored into the memory 21.

Then, the ONU control unit 20 compares the RRH-ID #1 acquired from the "Channel_Profile" message and the RRH-ID #m acquired from the RRH (#m) 4 with each other and decides that they do not coincide with each other (S21). Therefore, the ONU control unit 20 stops the transmission process of the "Serial_Number_ONU" message according to the "Channel_Profile" message. Therefore, the transmission unit (#1) 1b does not establish a link with the ONU (#m) 2.

On the other hand, the BBU (#n) 3 notifies the transmission unit (#n) 1b of the RRH-ID #m, and the transmission unit (#n) 1b replies ACK to the BBU (#n) 3. At this time, the control IF unit 12 acquires and outputs the RRH-ID #m from the BBU (#n) 3 to the transmission control unit 10. It is to be noted that the RRH-ID #m is stored into the memory 11.

Further, if the power to the ONU (#m) 2 is turned on, the RRH (#1) 4 transmits the RRH-ID #1 to the ONU (#1) 2, and the ONU (#1) 2 replies ACK to the RRH (#1) 4. At this time, the control IF unit 22 acquires and outputs the RRH-ID #1 from the RRH (#1) 4 to the ONU control unit 20. It is to be noted that the RRH-ID #1 is stored into the memory 21.

The transmission unit (#n) 1b transmits a "Channel_Profile" message including the wavelength information (λdn, λun) and the RRH-ID #m. At this time, the MSG processing unit 19 creates a "Channel_Profile" message in accordance with an instruction of the transmission control unit 10, and the "Channel_Profile" message is transmitted from the transmitter 170. The "Channel_Profile" message is transmitted after time Ton and received by the ONU (#m) 2 and the ONU (#1) 2.

The ONU (#1) 2 sweeps the wavelength of the wavelength filter 270 to receive the "Channel_Profile" message by the receiver 271 thereof. It is to be noted that the wavelength at this time coincides with the wavelength λdn indicated by the wavelength information in the "Channel_Profile" message.

The ONU control unit 20 acquires the wavelength information and the RRH-ID #m from the "Channel_Profile" message. The ONU control unit 20 sets the up wavelength λun indicated by the wavelength information to the transmitter 272 (S25). It is to be noted that the RRH-ID #1 is stored into the memory 21.

Then, the ONU control unit 20 compares the RRH-ID #m acquired from the "Channel_Profile" message and the RRH-ID #1 acquired from the RRH (#1) 4 with each other, and decides that they do not coincide with each other (S26). Therefore, the ONU control unit 20 stops the instruction for creation of a "Serial_Number_ONU" message according to the "Channel_Profile" message. Therefore, the transmission unit (#n) 1b does not establish a link with the ONU (#1) 2.

On the other hand, in the ONU (#m) 2, the ONU control unit 20 acquires the wavelength information and the RRH-ID #m from the "Channel_Profile" message. The ONU control unit 20 sets the wavelength λun indicated by the wavelength information to the transmitter 272 (S22).

Then, the ONU control unit 20 compares the RRH-ID #m acquired from the "Channel_Profile" message and the RRH-ID #m acquired from the RRH #m) 4 with each other and decides that they coincide with each other (S23). Therefore, the ONU control unit 20 instructs the MSG processing unit 29 to create a "Serial_Number_ONU" message according to the "Channel_Profile" message.

The MSG processing unit 29 creates a "Serial_Number_ONU" message in accordance with the instruction of the ONU control unit 20. The transmitter 272 transmits an up signal including the "Serial_Number_ONU" message. At this time, since the wavelength of the up signal coincides with the wavelength λun indicated by the wavelength information in the "Channel_Profile" message, the transmission unit (#n) 1b may receive the "Serial_Number_ONU" message. However, the transmission unit (#1) 1b fails to receive the "Serial_Number_ONU" message.

In the transmission unit (#n) 1b, the receiver 171 receives the up signal including the "Serial_Number_ONU" message, then the transmission control unit 10 receives the "Serial_Number_ONU" message from the MSG processing unit 19. The transmission control unit 10 registers the ONU (#m) 2 into the activation list in the memory 11 in response to the "Serial_Number_ONU" message (S27). To the ONU 2 registered in the activation list, a band of a main signal in the PON 9 is allocated.

Then, the transmission control unit 10 instructs the MSG processing unit 19 to create an "Assign_ONU-ID" message whose destination is the ONU (#m) 2 that is the transmission source of the "Serial_Number_ONU" message. The MSG processing unit 19 creates an "Assign_ONU-ID" message in accordance with the instruction. The transmitter 170 transmits a down signal including the "Assign_ONU_ID" message to the ONU (#m) 2. The ONU (#m) 2 receives the "Assign_ONU-ID" message.

In the ONU (#m) 2, the receiver 271 receives the down signal including the "Assign_ONU-ID" message, and the ONU control unit 20 receives the "Assign_ONU-ID" message from the MSG processing unit 29. The ONU control unit 20 acquires and stores the ONU-ID from the "Assign_ONU-ID" message into the memory 21. The ONU control unit 20 performs communication setting required for transmission of a main signal with the transmission unit (#n) 1b based on the ONU-ID (S28).

Consequently, the ONU (#m) 2 is placed into an activated state, and a link is established between the transmission unit (#n) 1b and the ONU (#m) 2. Based on the established link the transmission unit (#n) 1b and the ONU (#m) 2, a relay path for relaying communication between the BBU (#1) 3 and the RRH (#m) is set. It is to be noted that the transmission control unit 10 is an example of a setting unit for setting a relay path.

The transmission control unit 10 of the transmission unit (#1) 1b notifies the BBU (#1) 3 of completion of the link establishment through the control IF unit 12. The ONU control unit 20 of the ONU (#m) 2 notifies the RRH (#m) 4 of the completion of the link establishment through the control IF unit 22. In response to the notifications, the BBU (#n) 3 and the RRH (#m) 4 start communication therebetween.

Referring now to FIG. 8, the transmission unit (#1) 1b that is in a non-linked state transmits a "Channel_Profile" message including the wavelength information (λd1, λu1) and the RRH-ID #1. Since the ONU (#m) 2 is activated already, only the ONU (#1) 2 receives the "Channel_Profile" message.

In the ONU (#1) 2, the ONU control unit 20 sets the up wavelength λun indicated by the wavelength information in the "Channel_Profile" message to the transmitter 272 (S30). Then, the ONU control unit 20 compares the RRH-ID #1 acquired from the "Channel_Profile" message and the RRH-ID #1 acquired from the RRH (#1) 4 with each other and decides that they coincide with each other (S31). Therefore, the ONU control unit 20 instructs the MSG processing unit 29 to create a "Serial_Number_ONU" message according to the "Channel_Profile" message.

In the transmission unit (#1) 1b, the transmission control unit 10 receives the "Serial_Number_ONU" message from the MSG processing unit 19 and registers the ONU (#1) 2 into the activation list (S33). Then, the transmission unit (#1) 1b transmits an "Assign_ONU-ID" message to the ONU (#1) 2. The ONU (#1) 2 performs communication setting in response to the "Assign_ONU-ID" message (S34).

Consequently, the ONU (#1) 2 is placed into an activated state, and a link is established between the transmission unit (#1) 1b and the ONU (#1) 2. The transmission unit (#1) 1b notifies the BBU (#1) 3 of completion of link establishment, and the ONU (#1) 2 notifies the RRH (#1) 4 of the completion of the link establishment. In response to this, the BBU (#1) 3 and the RRH (#1) 4 start communication therebetween.

Now, operation of a BBU 3, a transmission unit 1b, an ONU 2, and an RRH 4 is described.

Figure 10:
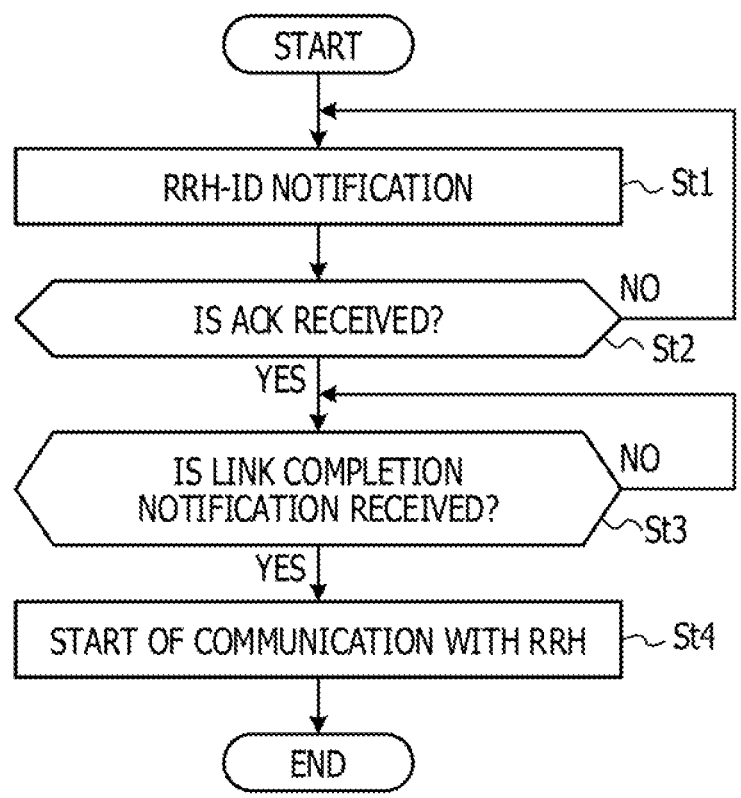
FIG. 10 is a flow chart depicting an example of operation of a BBU.

FIG. 10 is a flow chart depicting an example of operation of a BBU 3. The control unit 30 notifies the transmission unit 1b of the RRH-ID thereof through the control IF unit 32 (step St1). Then, the control unit 30 decides whether or not ACK is received from the transmission unit 1b through the control IF unit 32 (step St2). In the case where ACK is not received as yet (No in step St2), the processes in the steps beginning with step St1 are executed again.

Then, in the case where ACK is received already (Yes in step St2), the control unit 30 decides whether or not a notification of completion of link establishment is received from the transmission unit 1b through the control IF unit 32 (step St3). Then, the control unit 30 controls the baseband processing unit 34 and the optical IF unit 33 to start communication with the RRH 4 (step St4). The BBU 3 operates in this manner.

Figure 11:
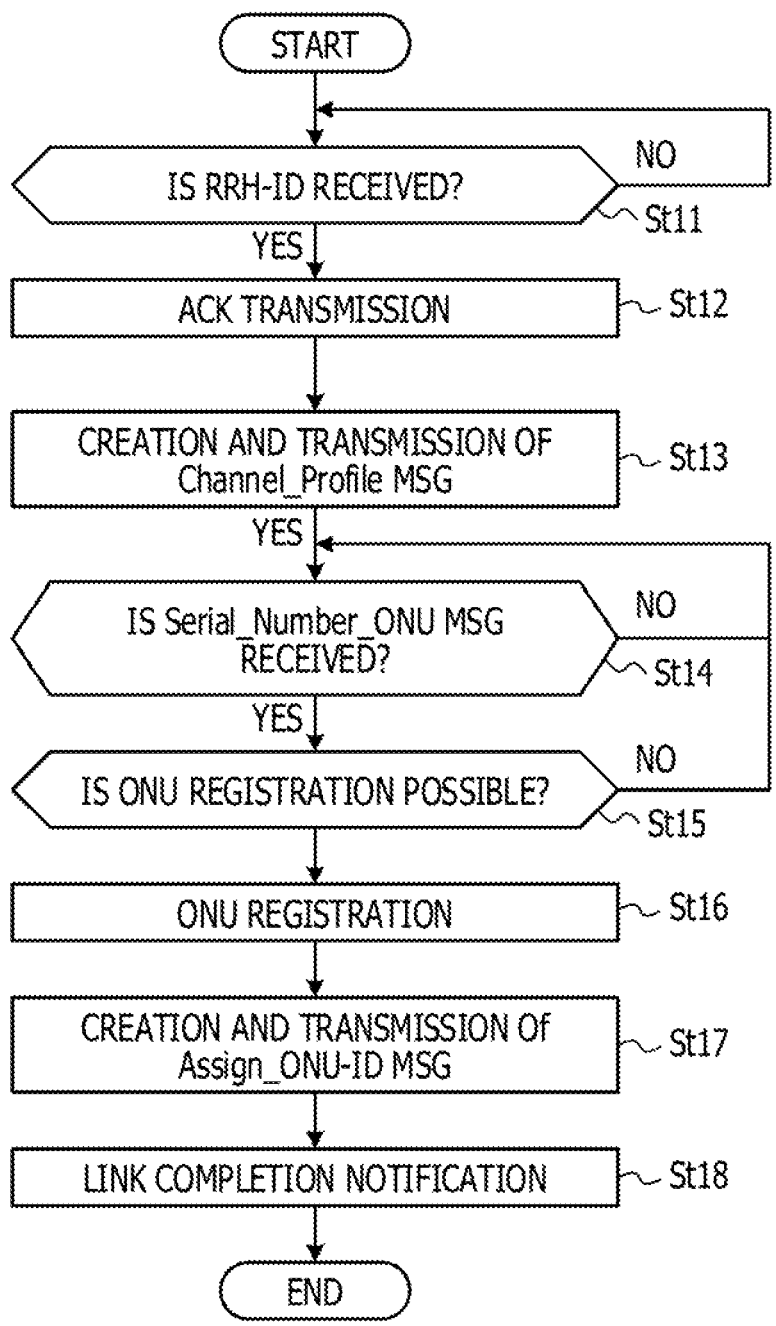
FIG. 11 is a flow chart depicting an example of operation of a transmission unit.

FIG. 11 is a flow chart depicting an example of operation of a transmission unit 1b. The transmission control unit 10 decides whether or not an RRH-ID is received from a BBU 3 through the control IF unit 12 (step St11). In the case where an RRH-ID is not received as yet (No in step St11) the process in step St11 is executed again.

On the other hand, in the case where an RRH-ID is received already (Yes in step St11), the transmission control unit 10 transmits ACK to the BBU 3 through the control IF unit 12 (step St12). Then, the MSG processing unit 19 creates a "Channel_Profile" message in accordance with an instruction of the transmission control unit 10, and the transmitter 170 transmits the "Channel_Profile" message (step St13).

Then, the transmission control unit 10 decides whether or not a "Serial_Number_ONU" message is received (step St14). In the case where a "Serial_Number_ONU" message is not received as yet (No in step St14), the processes in the steps beginning with step St13 are executed.

On the other hand, in the case where a "Serial_Number_ONU" message is received already (Yes in step St14), the transmission control unit 10 decides from parameters in the "Serial_Number_ONU" message whether or not the ONU 2 is capable of being registered (step St15). In the case where the ONU 2 is not capable of being registered (No in step St15), the processes in the steps beginning with step St13 are executed again.

On the other hand, in the case where the ONU 2 is capable of being registered (Yes in step St15), the transmission control unit 10 registers the ONU 2 into the activation list (step St16). Then, the MSG processing unit 19 creates an "Assign_ONU-ID" message in accordance with an instruction of the transmission control unit 10, and the transmitter 170 transmits the "Assign_ONU-ID" message (step St17).

Thereafter, the transmission control unit 10 notifies the BBU 3 of completion of link establishment through the control IF unit 12 (step St18). The transmission unit 1b operates in this manner.

Figure 12:
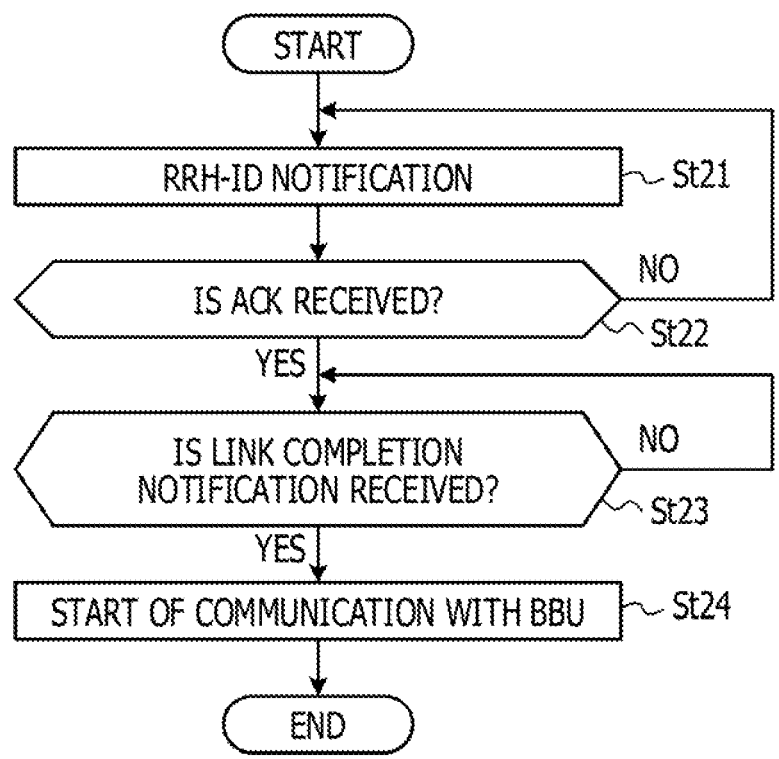
FIG. 12 is a flow chart depicting an example of operation of an RRH.

FIG. 12 is a flow chart depicting an example of operation of an RRH 4. The control unit 40 notifies an ONU 2 of the RRH-ID thereof through the control IF unit 42 (step St21). Then, the control unit 40 decides whether or not ACK is received from the ONU 2 through the control IF unit 42 (step St22). In the case where ACK is not received as yet (No in step St22), the processes in the steps beginning with step St21 are executed again.

On the other hand, in the case where ACK is received already (Yes in step St22), the control unit 40 decides whether or not a notification of completion of link establishment is received from the ONU 2 through the control IF unit 22 (step St23). Then, the control unit 40 controls the wireless processing unit 44 and the optical IF unit 43 to start communication with the BBU 3 (step St24). The RRH 4 operates in this manner.

Figure 13:
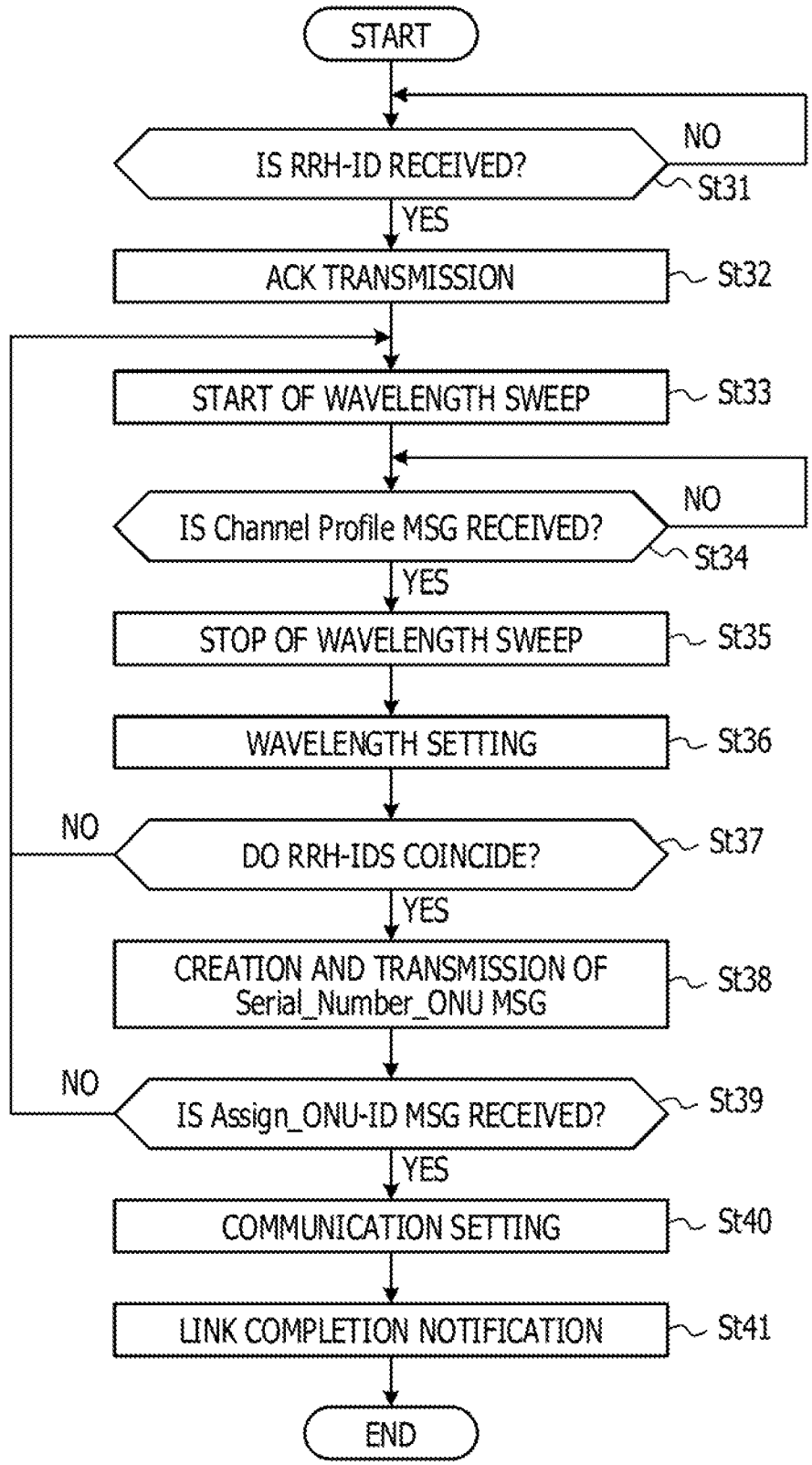
FIG. 13 is a flow chart depicting an example of operation of an ONU.

FIG. 13 is a flow chart depicting an example of operation of an ONU 2. The ONU control unit 20 decides whether or not an RRH-ID is received from an RRH 4 through the control IF unit 22 (step St31). In the case where an RRH-ID is not received as yet (No in step St31), the process in step St31 is executed again.

On the other hand, in the case where an RRH-ID is received already (Yes in step St31), the ONU control unit 20 transmits ACK to the RRH 4 through the control IF unit 22 (step St32). Then, the ONU control unit 20 starts sweep of the wavelength of the wavelength filter 270 (step St33). The ONU control unit 20 performs the sweep, for example, by sequentially selecting and setting a plurality of down wavelengths $\lambda d1, \ldots, \lambda dn$ one by one at fixed intervals to the wavelength filter 270.

Then, the ONU control unit 20 decides whether or not a "Channel_Profile" message is received from the MSG processing unit 29 (step St34). In the case where a "Channel_Profile" message is not received as yet (No in step St34), the process in step St34 is executed again.

In the case where a "Channel_Profile" message is received already (Yes in step St34), the ONU control unit 20 stops the sweep of the wavelength of the wavelength filter 270 (step St35). At this time, the wavelength of the wavelength filter 270 is a wavelength when the "Channel_Profile" message is received.

Then, the ONU control unit 20 sets a wavelength $\lambda u1, \ldots, \lambda un$ indicated by the wavelength information of the "Channel_Profile" message to the transmitter 272 (step St36). Consequently, since the transmitter 272 transmits an optical signal of a wavelength $\lambda u1, \ldots, \lambda un$ that may be received by the receiver 171 of the transmission unit 1b, the transmission unit 1b may receive a message from the ONU.

Then, the ONU control unit 20 compares the RRH-ID in the "Channel_Profile" message and the RRH-ID received from the RRH 4 with each other (step St37). In the case where the RRH-IDs do not coincide with each other (No in step St37), the processes in the steps beginning with step St33 are executed. In the case where the RRH-IDs coincide with each other (Yes in step St37), the ONU control unit 20 controls the MSG processing unit 29 to create a "Serial_Number_ONU" message, and the transmitter 272 transmits the "Serial_Number_ONU" message (step St38).

In this manner, the ONU control unit 20 acquires the RRH-ID from the RRH 4 and decides based on the RRH-ID in the "Channel_Profile" message and the RRH-ID acquired from the RRH 4 whether or not the RRH 4 of the coupling destination is the RRH of the communication destination of the BBU 3.

Then, the ONU control unit 20 decides whether or not an "Assign_ONU-ID" message is received from the MSG processing unit 29 within a given time period after the transmission of the "Serial_Number_ONU" message (step St39). In the case where an "Assign_ONU-ID" message is not received as yet (No in step St39), the process in step St33 is executed again.

On the other hand, in the case where an "Assign_ONU-ID" message is received already (Yes in step St39), the ONU control unit 20 performs communication setting for communicating with the transmission unit 1b in response to the "Assign_ONU-ID" message (step St40). Consequently, a link is established between the transmission unit 1b and the ONU 2.

Then, the ONU control unit 20 notifies the RRH 4 of completion of link establishment through the control IF unit 22 (step St41). The ONU 2 operates in this manner.

In this manner, in the transmission unit 1b, the control IF unit 12 acquires an RRH-ID for identifying an RRH 4 of the communication destination of a BBU 3 from the BBU 3. The receiver 171 receives an up signal of a given up wavelength $\lambda u1, \ldots, \lambda un$ from each ONU 2. The transmitter 170 transmits a "Channel_Profile" message including the wavelength information indicative of the up wavelength $\lambda u1, \ldots, \lambda un$ and the RRH-ID to each ONU 2.

Therefore, each ONU 2 may decide based on the RRH-ID in the "Channel_Profile" message whether or not the RRH 4 of the coupling destination is the RRH 4 of the communication destination of the BBU 3. Further, each ONU 2 may transmit an optical signal of an up wavelength $\lambda u1, \ldots, \lambda un$ that may be received by the transmission unit 1b in accordance with the wavelength information.

Accordingly, the ONU 2 coupled to the RRH 4 of the communication destination of the BBU 3 may transmit an optical signal of an up wavelength $\lambda u1, \ldots, \lambda un$ with a "Channel_Profile" message superimposed therein to the transmission unit 1b. Further, the other ONUs 2 may refrain from transmitting a "Channel_Profile" message based on a result of the decision. Therefore, to the transmission unit 1b, a "Channel_Profile" message is transmitted only from the ONU 2 coupled to the RRH 4 of the communication destination of the BBU 3.

When the receiver 171 receives a "Serial_Number_ONU" message of an up wavelength $\lambda u1, \ldots, \lambda un$ according to a "Channel_Profile" message from an ONU 2 coupled to the RRH 4 of the communication destination of the BBU 3, the transmission control unit 10 sets a relay path for relaying communication between the BBU 3 and the RRH 4 of the communication destination.

Therefore, the BBU 3 may communicate with the RRH 4 of the communication destination through the transmission unit 1b and the ONU 2. This makes communication between a BBU 3 and an RRH 4 corresponding to each other possible.

Further, in the ONU 2, the receiver 271 receives a "Channel_Profile" message including wavelength information and an RRH-ID. The ONU control unit 20 decides based on the RRH-ID whether or not the RRH 4 of the coupling destination is the RRH of the communication destination of the BBU 3, and controls, in the case where the RRH 4 of the coupling destination is the RRH of the communication destination, the transmitter 272 to transmit a "Serial_Number_ONU" message of the up wavelength $\lambda u1, \ldots, \lambda un$ indicated by the wavelength information.

When the receiver 271 receives an "Assign_ONU-ID" message according to a "Channel_Profile" message from the transmission unit 1b, the ONU control unit 20 sets a relay path for relaying communication between the BBU 3 and the RRH 4 to the transmission unit 1b. Therefore, the advantageous effects described hereinabove are obtained.

Further, in the present example, since the RRH-ID is used as communication destination information of the BBU 3, the ONU 2 may decide based on information unique to the RRH 4 itself whether or not the RRH 4 of the coupling destination is the RRH 4 of the communication destination of the BBU 3. However, the communication destination information is the RRH-ID, and besides, position information indicative of an installation position of the RRH 4 may be used as described below.

Figure 14:
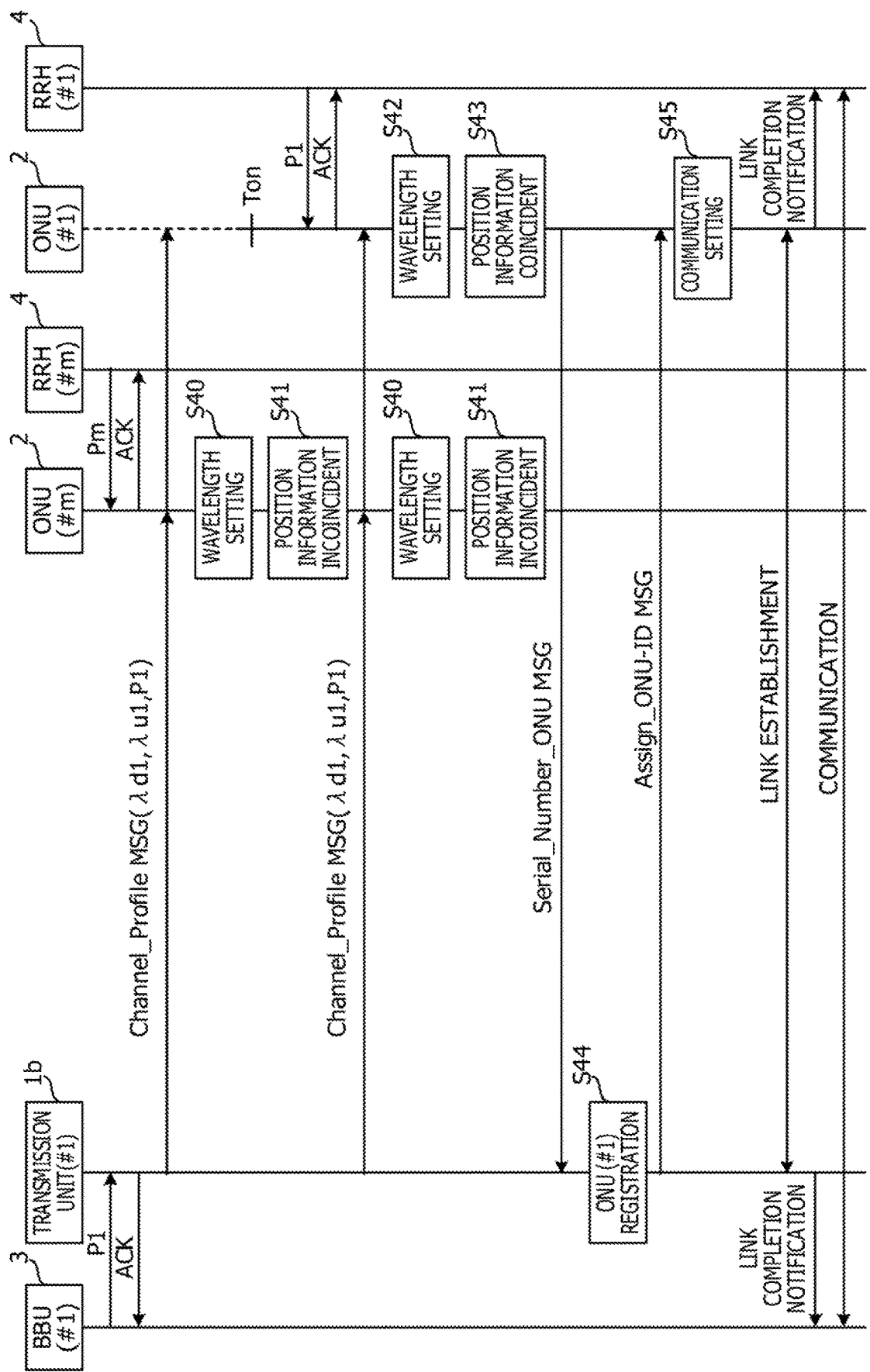
FIG. 14 is a sequence diagram depicting another example of a process for establishing a link between a transmission unit and an ONU.

FIG. 14 is a sequence diagram depicting another example of a process for establishing a link between a transmission unit 1b and an ONU 2. Description of processes in FIG. 14 common to those in FIGS. 7 and 8 is omitted.

Although the present example is directed to a sequence for establishing a link between one transmission unit (#1) 1b of PtP WDM and two non-activated ONUs (#1, #m) 2, there is no restriction to the number of such transmission units 1b and ONUs 2. Further, it is assumed that, since the power to the ONU (#1) 2 is turned on at time Ton later than the ONU (#m) 2, the ONU (#1) 2 receives a message transmitted from the transmission unit (#1) 1b after time Ton.

The BBU (#1) 3 notifies the transmission unit (#1) 1b of position information P1, and the transmission unit (#1) 1b replies ACK to the BBU (#1) 3. The position information P1 is stored in the memory 31 in advance and indicates the position of the RRH (#1) 4 of the communication destination of the BBU (#1) 3. As the position information P1, for example, a latitude and a longitude or the like may be used. The control IF unit 12 acquires and outputs the position information P1 from the BBU (#1) 3 to the transmission control unit 10. It is to be noted that the position information P1 is stored into the memory 11.

Further, the RRH (#m) 4 transmits position information Pm to the ONU (#m) 2, and the ONU (#m) 2 replies ACK to the RRH (#m) 4. The position information Pm is notified, for example, periodically from the GPS communication unit 45 to the control unit 40 and indicates the position of the RRH (#m) 4. At this time, the control IF unit 22 acquires and outputs the position information Pm from the RRH (#m) 3 to the ONU control unit 20. It is to be noted that the position information Pm is stored into the memory 21.

The transmission unit (#1) 1b transmits a "Channel_Profile" message including the wavelength information (λd1, λu1) and the position information P1. At this time, the MSG processing unit 19 creates a "Channel_Profile" message in accordance with an instruction of the transmission control unit 10, and the "Channel_Profile" message is transmitted from the transmitter 170. Although the "Channel_Profile" message is received by the ONU (#m) 2 to which the power is on, it is not received by the ONU (#1) 2 to which the power is not on. It is to be noted that the position information P1 is inserted, for example, into the "RRH-ID" field of the "Channel_Profile" message depicted in FIG. 9.

In the ONU (#m) 2, the ONU control unit 20 sets the wavelength λu1 indicated by the wavelength information acquired from the "Channel_Profile" message to the transmitter 272 (S40). Then, the ONU control unit 20 compares the position information P1 acquired form the "Channel_Profile" (message and the position information Pm acquired from the RRH (#m) 4 with each other and decides that they do not coincide with each other (S41). Therefore, the ONU control unit 20 stops the transmission process of the "Serial_Number_ONU" message responsive to the "Channel_Profile" message. Therefore, the transmission unit (#1) 1b does not establish a link with the ONU (#m) 2.

Then, if the power to the ONU (#m) 2 is turned on, the RRH (#1) 4 transmits the position information P1 of the RRH (#1) 4 to the ONU (#1) 2, and the ONU (#1) 2 replies ACK to the RRH (#1) 4. At this time, the control IF unit 22 acquires and outputs the position information P1 from the BBU (#1) 3 to the ONU control unit 20. It is to be noted that the position information P1 is stored into the memory 21.

The transmission unit (#1) 1b transmits a "Channel_Profile" message including the wavelength information (λd1, λu1) and the position information P1. The "Channel_Profile" message is transmitted after time Ton and is received by the ONU (#m) 2 and the ONU (#1) 2. After the ONU (#m) 2 receives the "Channel_Profile" message, the above-described processes indicated by reference characters S40 and S41 are performed again.

Meanwhile, in the ONU (#1) 2, the ONU control unit 20 acquires the wavelength information and the position information P1 from the "Channel_Profile" message. The ONU control unit 20 sets the up wavelength λun indicated by the wavelength information to the transmitter 272 (S42).

Then, the ONU control unit 20 compares the position information P1 acquired from the "Channel_Profile" message and the position information P1 acquired from the RRH (#m) 4 with each other and decides that they coincide with each other (S43). Therefore, the ONU control unit 20 instructs the MSG processing unit 29 to create a "Serial_Number_ONU" message according to the "Channel_Profile" message. Consequently, the "Serial_Number_ONU" message is transmitted to the transmission unit 1b.

The transmission unit 1b registers the ONU (#1) 2 into the activation list in response to reception of the "Serial_Number_ONU" message (S44). Then, the transmission unit 1b transmits an "Assign_ONU-ID" message to the ONU (#1) 2. The ONU (#1) 2 performs communication setting in response to reception of the "Assign_ONU-ID" message (S45).

Therefore, a link is established between the transmission unit (#1) 1b and the ONU (#1) 2, and the BBU (#1) 3 may communicate with the RRH (#1) 4 of the communication destination through the transmission unit (#1) 1b and the ONU (#1) 2.

Now, operation of BBU 3, a transmission unit 1b, an ONU 2, and an RRH 4 is described.

Figure 15:
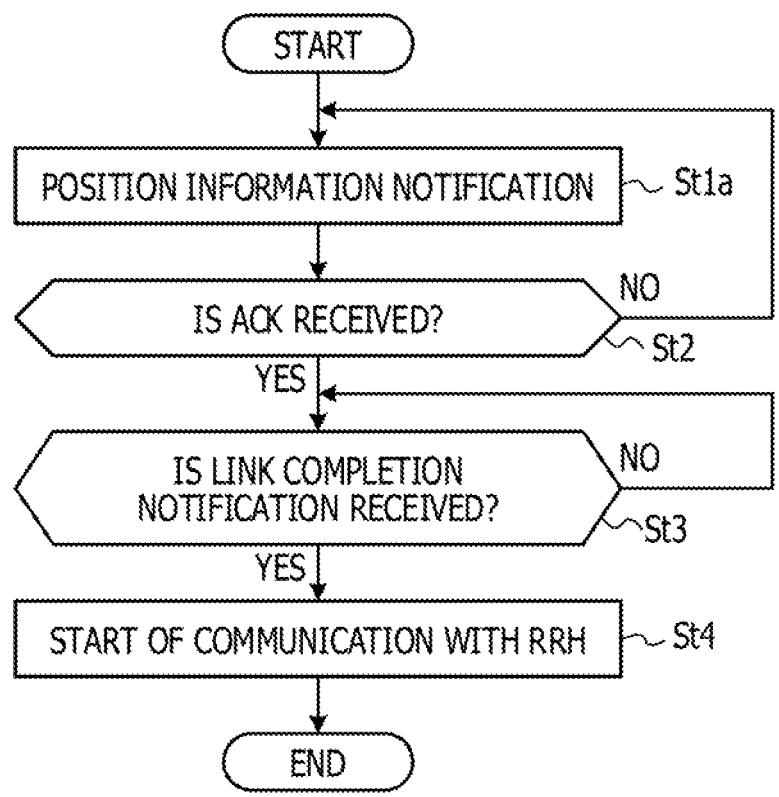
FIG. 15 is a flow chart depicting another example of operation of a BBU.

FIG. 15 is a flow chart depicting another example of operation of a BBU 3. In FIG. 15, like processes to those of FIG. 10 are denoted by like reference characters, and overlapping description of them is omitted.

The control unit 30 notifies a transmission unit 1b of position information of an RRH 4 of the communication destination through the control IF unit 32 (step St1a). For example, the position information is acquired from a wireless communication network by the control unit 40 and stored in the memory 31 in advance. The BBU 3 operates in this manner.

Figure 16:
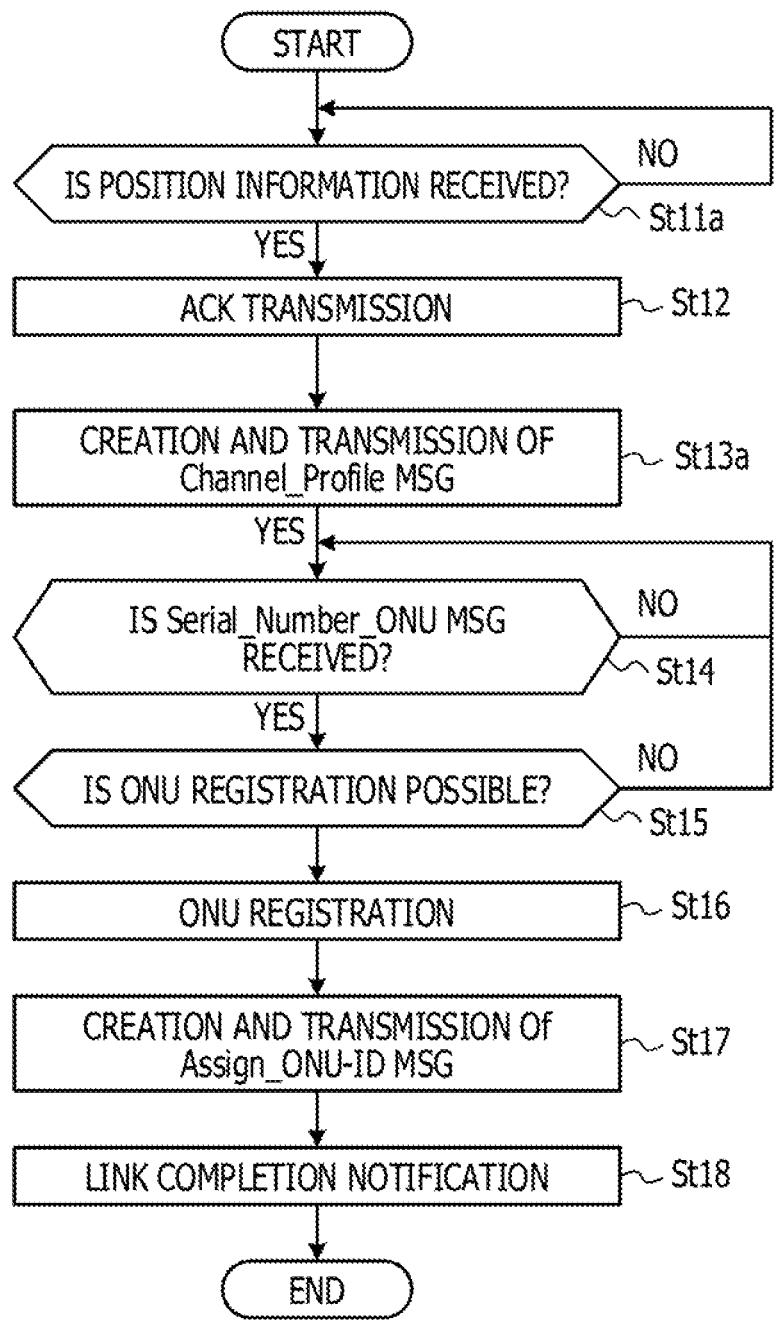
FIG. 16 is a flow chart depicting another example of operation of a transmission unit.

FIG. 16 is a flow chart depicting another example of operation of a transmission unit 1b. In FIG. 16, like processes to those of FIG. 11 are denoted by like reference characters, and overlapping description of them is omitted.

The transmission control unit 10 decides whether or not position information is received from a BBU 3 through the control IF unit 12 (step St11a). In the case where an RRH-ID is not received as yet (No in step St11a), the process in step St11a is executed again. On the other hand, in the case where an RRH-ID is received already (Yes in step St11a), the transmission control unit 10 transmits ACK to the BBU 3 through the control IF unit 12 (step St12).

Then, the MSG processing unit 19 creates a "Channel_Profile" message including the wavelength information and position information in accordance with an instruction of the transmission control unit 10, and the transmitter 170 transmits the "Channel_Profile" message (step St13a). The transmission unit 1b operates in this manner.

Figure 17:
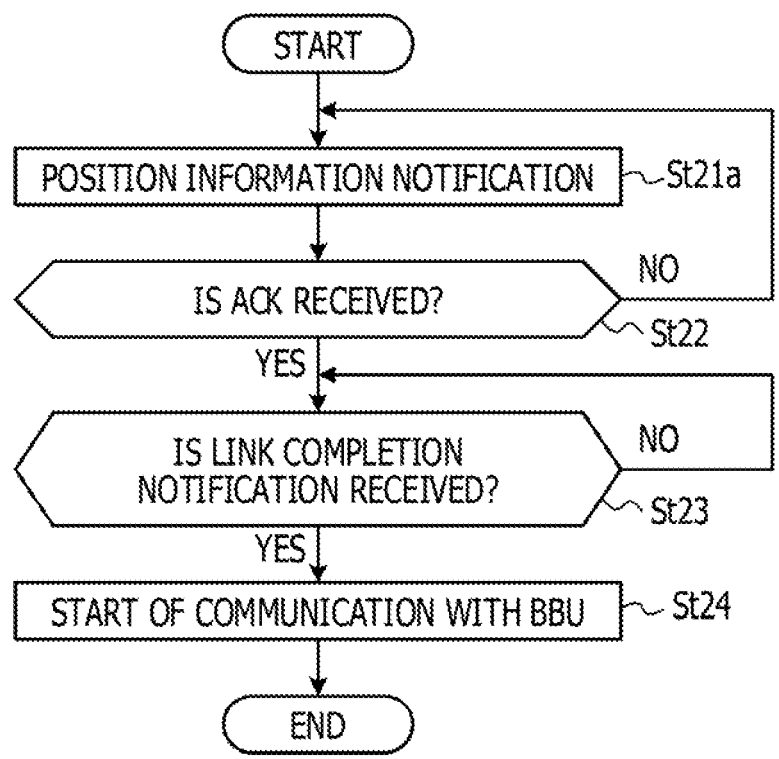
FIG. 17 is a flow chart depicting another example of operation of an RRH.

FIG. 17 is a flow chart depicting another example of operation of an RRH 4. In FIG. 17, like processes to those of FIG. 12 are denoted by like reference characters, and overlapping description of them is omitted.

The control unit 40 notifies an ONU 2 of the position information through the control IF unit 42 (step St21a). It is to be noted that the GPS communication unit 45 outputs the position information to the control unit 40, for example, cyclically by its GPS function. The RRH 4 operates in this manner.

Figure 18:
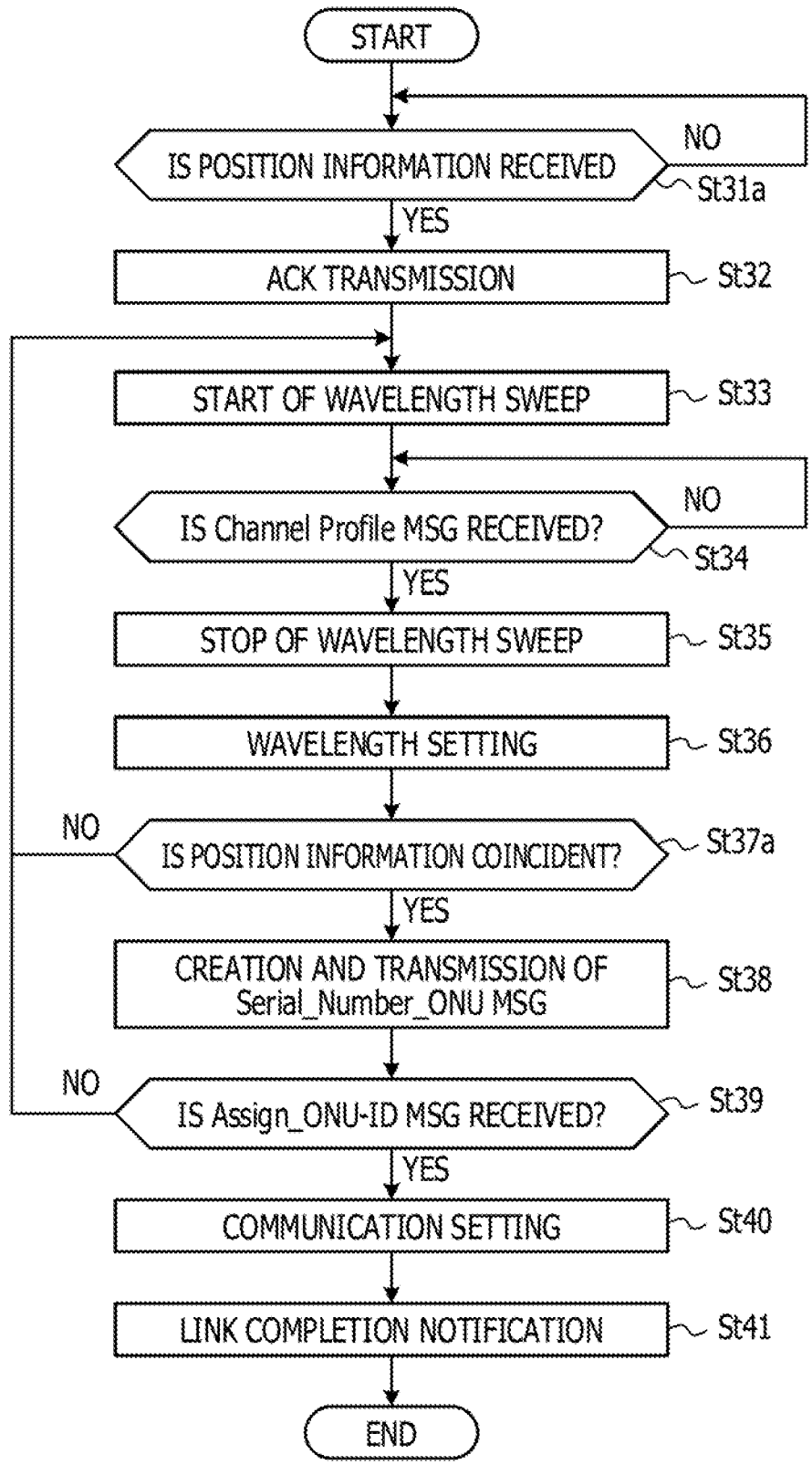
FIG. 18 is flow chart depicting another example of operation of an ONU.

FIG. 18 is a flow chart depicting another example of operation of an ONU 2. In FIG. 18, like processes to those of FIG. 13 are denoted by like reference characters, and overlapping description of them is omitted.

The ONU control unit 20 decides whether or not it receives position information from an RRH 4 through the control IF unit 22 (step St31a). In the case where position information is not received (No in step St31a), the process in step St31a is executed again. On the other hand, in the case where position information is received already (Yes in step St31a), the ONU control unit 20 transmits ACK to the RRH 4 through the control IF unit 22 (step St32). Thereafter, the processes in the steps beginning with step St34 are executed.

Thereafter, the ONU control unit 20 compares the position information in the "Channel_Profile" message and the position information received from the RRH 4 with each other (step St37a). In the case where the position information does not indicate coincidence (No step St37a), the processes in the steps beginning with step St33 are executed.

In this manner, the ONU control unit 20 acquires position information from the RRH 4 of the coupling destination and decides based on the position information in the "Channel_Profile" message and the position information acquired from the RRH 4 whether or not the RRH 4 is the RRH of the communication destination.

On the other hand, in the case where the position information indicates coincidence (Yes in step St37a), the ONU control unit 20 controls the MSG processing unit 29 to create a "Serial_Number_ONU" message, and the transmitter 170 transmits the "Serial_Number_ONU" message (step St38). At this time, for example, if the distance between the positions indicated by the position information is within a threshold value, the ONU control unit 20 decides that the position information coincides with each other. The ONU 2 operates in this manner.

Since, in the present example, position information indicative of the position of an RRH of a communication destination is used as the communication destination information, it is possible to manage position information appropriately, for example, in response to disposition of small cells.

Further, although each ONU 2 in the present example receives position information of an RRH 4 of a coupling destination, this is not restrictive. For example, in the case where an ONU 2 is installed at a position near to an RRH 4 of a coupling destination, position information acquired by the GPS communication unit 200 in the ONU 2 may be used in the following manner.

Figure 19:
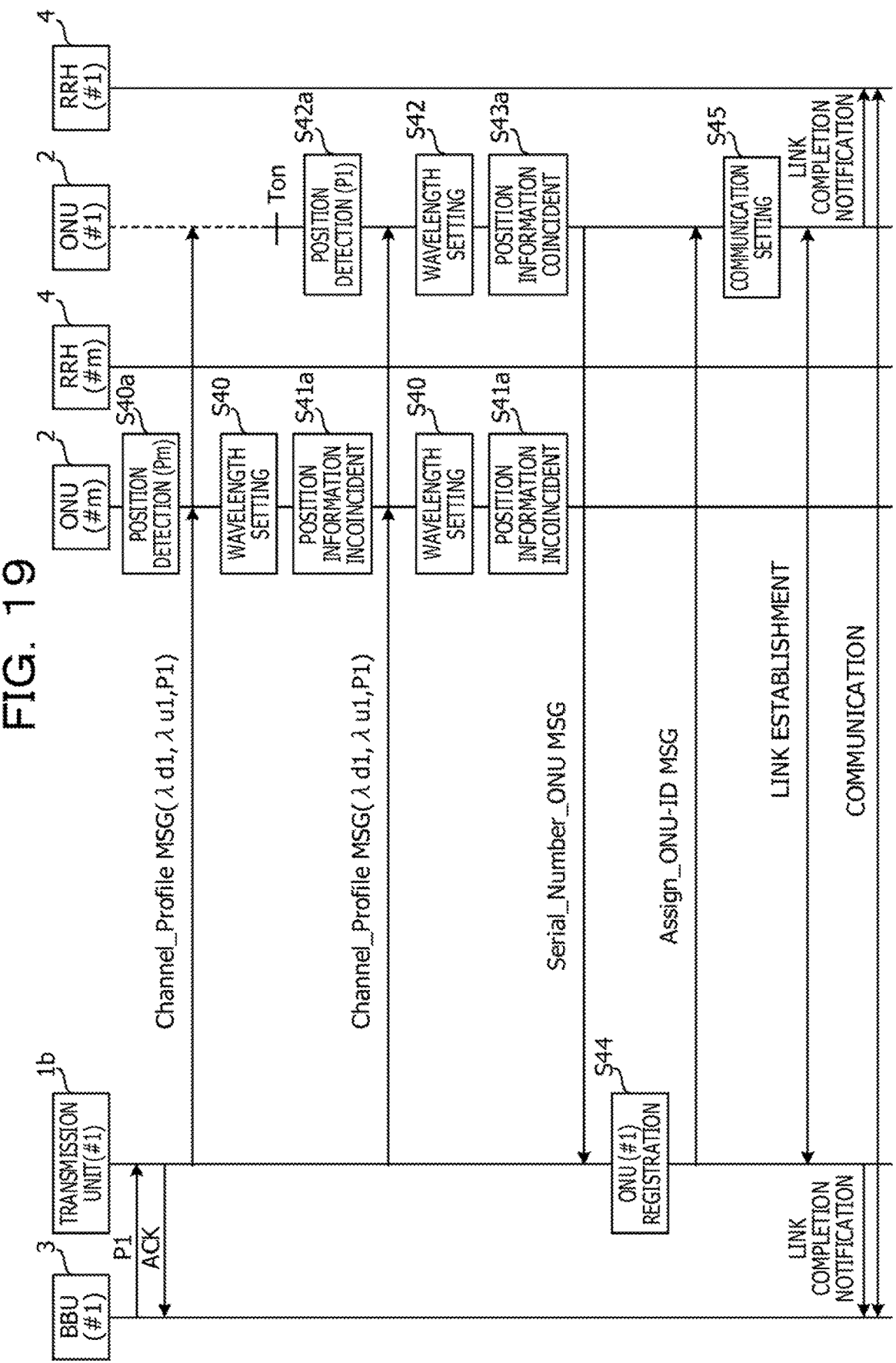
FIG. 19 is a sequence diagram depicting a further example of a process for establishing a link between a transmission unit and an ONU.

FIG. 19 is a sequence diagram depicting a further example of a process for establishing a link between a transmission unit 1b and an ONU 2. In FIG. 19, like processes to those of FIG. 14 are denoted by like reference characters, and overlapping description of them is omitted.

The ONU (#m) 2 and the ONU (#1) 2 detect position information Pm and P1, respectively, by the GPS communication unit 200 (S40a, S42a). The GPS communication unit 200 outputs the position information Pm and P1 to the ONU control unit 20, for example, cyclically by the GPS function thereof.

In the ONU (#m) 2 and the ONU (#1) 2, the ONU control unit 20 decides whether or not the position information Pm and P1 from the GPS communication unit 200 and the position information P1 in the "Channel_Profile" message with each other (S41a, S43a). Similar processes to those in the example of FIG. 14 are performed based on a result of the decision. A link is established between the transmission unit 1b and the ONU 2 in this manner.

Now, an example of operation of the ONU 2 is described.

Figure 20:
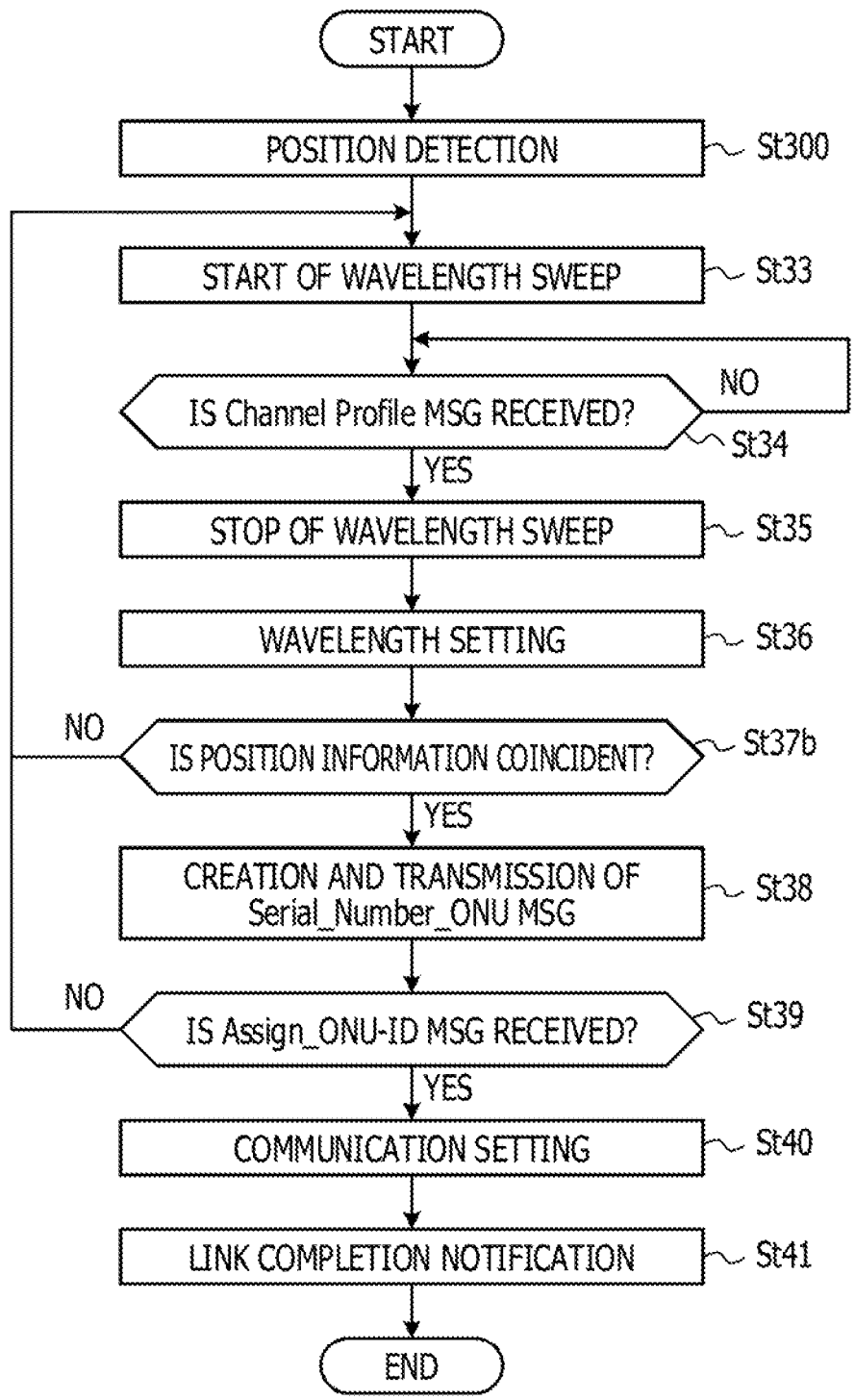
FIG. 20 is a flow chart depicting a further example of operation of an ONU.

FIG. 20 is a flow chart depicting a further example of operation of the ONU 2. In FIG. 20, like processes to those of FIG. 18 are denoted by like reference characters, and overlapping description of them is omitted.

The GPS communication unit 200 detects position information by the GPS function thereof (step St300). The position information is outputted to the ONU control unit 20. Thereafter, processes in the steps beginning with step St33 are executed.

After the sweep of the wavelength is stopped (step St35), the ONU control unit 20 compares the position information in the "Channel_Profile" message and the position information detected by the GPS communication unit 200 with each other (step St37b). In the case where the position information does not indicate coincidence (No in step St37b) the processes in the steps beginning with step St33 are executed.

On the other hand, in the case where the position information indicates coincidence (Yes in step St37b), the ONU control unit 20 controls the MSG processing unit 29 to create a "Serial_Number_ONU" message, and the transmitter 272 transmits the "Serial_Number_ONU" message (step St38). The ONU 2 operates in this manner.

In this manner, the ONU control unit 20 decides based on the position information detected by the GPS communication unit 200 and the position information in the "Channel_Profile" message whether or not the RRH 4 is the RRH of the communication destination. Therefore, the ONU 2 may save time and effort for acquiring position information from the RRH 4.

(Modifications)

While, in the embodiments described above, the ONU 2 performs decision relating to an RRH 4 of the communication destination, alternatively the transmission unit 1b may perform the decision. In this case, a "Serial_Number_ONU" message including the RRH-ID or the position information is transmitted from the ONU 2. It is to be noted that, although the examples described above are directed to position information, also with regard to an RRH-ID, similar processes to those in the case of position information may be performed.

Figure 21:
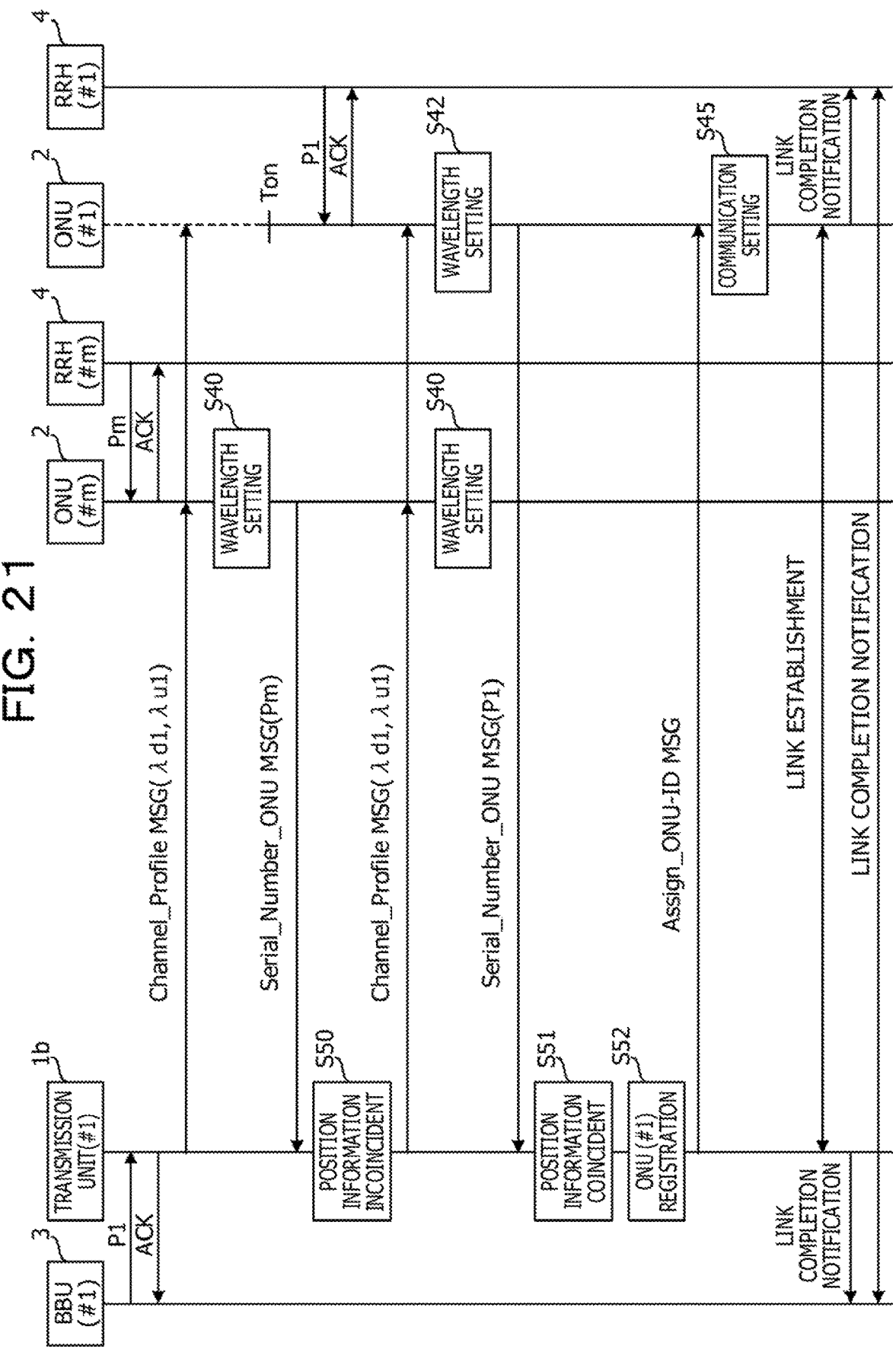
FIG. 21 is a sequence diagram depicting a still further example of a process for establishing a link between a transmission unit and an ONU.

FIG. 21 is a sequence diagram depicting a still further example of a process for establishing a link between a transmission unit 1b and an ONU 2. In FIG. 21, like processes to those of FIG. 14 are denoted by like reference characters, and overlapping description of them is omitted.

The ONU (#m) 2 transmits a "Serial_Number_ONU" message including position information Pm to the transmission unit (#1) 1b in response to reception of a "Channel_Profile" message. It is to be noted that the "Channel_Profile" message does not include position information P1.

FIG. 22 is a view depicting an example of a "Serial_Number_ONU" message including position information. In FIG. 22, each numeral in the vertical direction and the horizontal direction represents the position of each field in the message in octets.

Into a field indicated by a broken line frame, position information is inserted. The position information is inserted into a "Position" field. It is to be noted that contents of the other fields are prescribed in ITU-T Recommendation G.989.3.

Referring to FIG. 21 again, the transmission unit (#1) 1b compares the position information Pm in the "Serial_Number_ONU" message and the position information P1 acquired from the BBU 3 with each other and decides that they do not coincide with each other (S50). Therefore, the transmission unit (#1) 1b does not transmit an "Assign_ONU-ID" message to the ONU (#m) 2.

Further, the ONU (#1) 2 transmits a "Serial_Number_ONU" message including the position information P1 to the transmission unit (#1) 1b in response to reception of the "Channel_Profile" message.

The transmission unit (#1) 1b compares the position information P1 in the "Serial_Number_ONU" message and the position information P1 acquired from the BBU 3 with each other and decides that they coincide with each other (S51). Therefore, the transmission unit (#1) 1b registers the ONU (#1) 2 (S52) and transmits an "Assign_ONU-ID" message to the ONU (#1) 2.

Therefore, a link is established between the transmission unit (#1) 1b and the ONU (#1) 2.

Now, operation of a transmission unit 1b and an ONU 2 is described. It is to be noted that operation of the BBU 3 and the RRH 4 is similar to that described hereinabove with reference to FIGS. 15 and 17, respectively.

Figure 23:
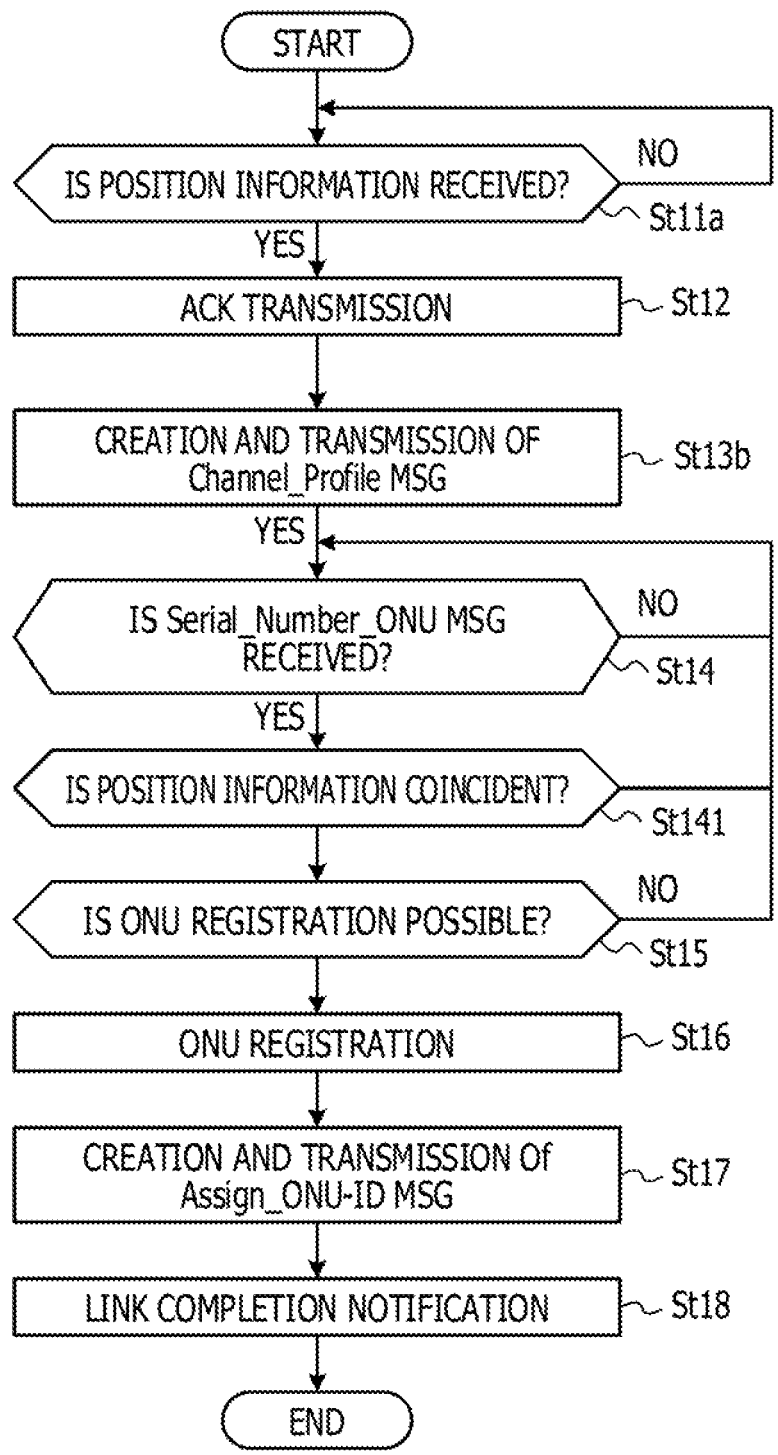
FIG. 23 is a flow chart depicting a further example operation of a transmission unit.

FIG. 23 is a flow chart depicting a further example of operation of the transmission unit 1b. In FIG. 23, like processes to those of FIG. 16 are denoted by like reference characters, and overlapping description of them is omitted.

After transmission of ACK (step St12), the MSG processing unit 19 creates a "Channel_Profile" message that does not include position information but includes wavelength information in accordance with an instruction of the transmission control unit 10, and the transmitter 170 transmits the "Channel_Profile" message (step St13b).

Then, the transmission control unit 10 decides whether or not a "Serial_Number_ONU" message is received (step St14). If a "Serial_Number_ONU" message is not received as yet (No in step St14), processes in the steps beginning with step St13b.

In the case where a "Serial_Number_ONU" message is received already (Yes in step St14), the transmission control unit 10 compares the position information in the "Serial_Number_ONU" message and the position information acquired from the BBU 3 with each other (step St141). In the case where the position information does not indicate coincidence (No in step St141), the processes in the steps beginning with step St13b are executed again. On the other hand, in the case where the position information indicates coincidence (Yes in step St141), the processes in the steps beginning with step St15 are executed. The transmission unit 1b operates in this manner.

Figure 24:
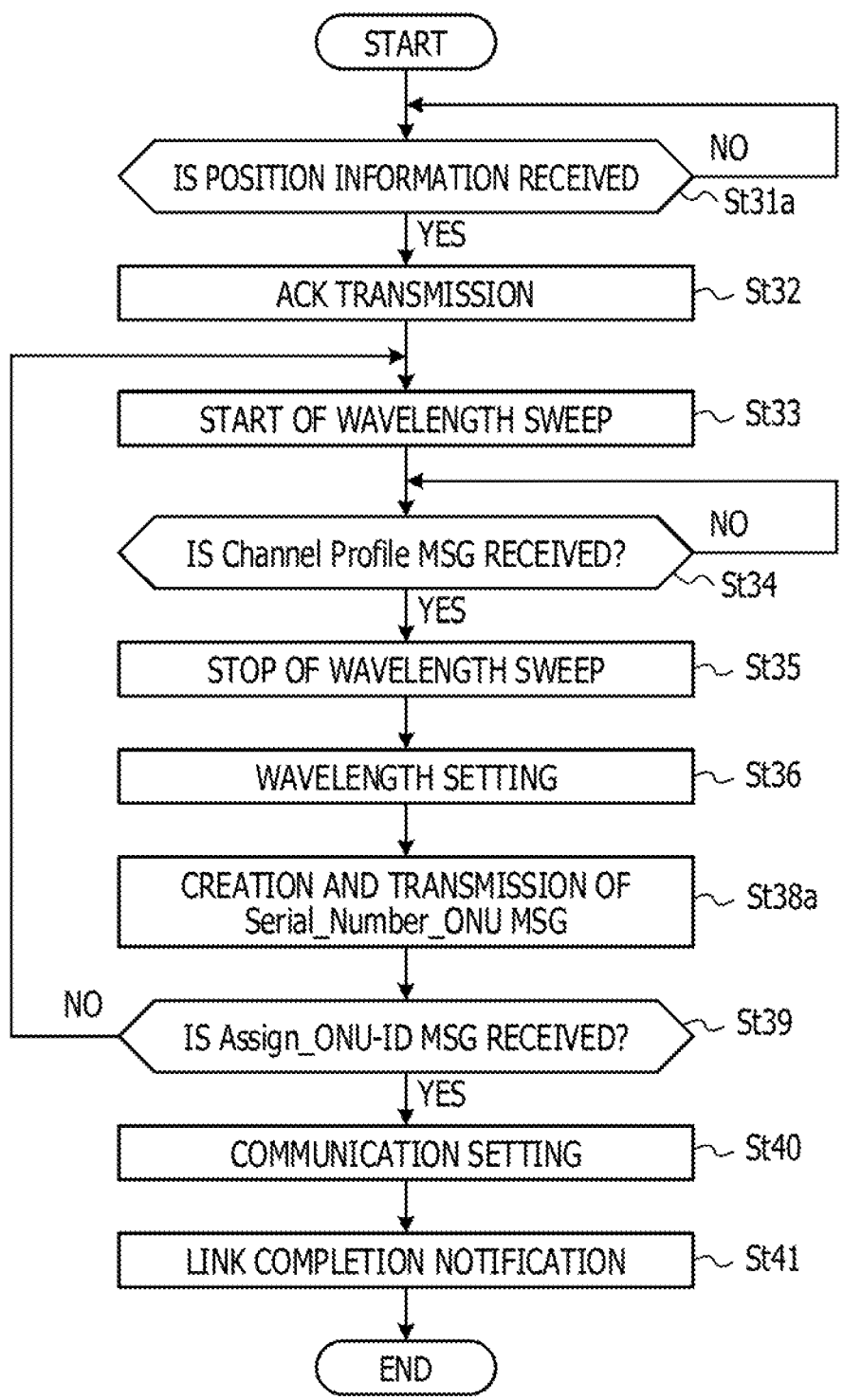
FIG. 24 is a flow chart depicting a still further example of operation of an ONU.

FIG. 24 is a flow chart depicting a still further example of operation of an ONU 2. In FIG. 24, like processes to those of FIG. 18 are denoted by like reference characters, and overlapping description of them is omitted.

After the ONU control unit 20 set a wavelength (step St36), it controls the MSG processing unit 29 to create a "Serial_Number_ONU" message including position information, and the transmitter 272 transmits the "Serial_Number_ONU" message (step St38a). Thereafter, the processes in the steps beginning with step St39 are executed. The ONU 2 operates in this manner.

In this manner, in the transmission unit 1b, the transmission control unit 10 decides based on the position information in the "Serial_Number_ONU" message and the position information acquired from the BBU 3 whether or not the RRH 4 coupled to the ONU 2 of the transmission source of the "Serial_Number_ONU" message is the RRH of the communication destination of the BBU 3. In the case where the RRH 4 coupled to the ONU 2 of the transmission source is the RRH of the communication destination of the BBU 3, the transmission control unit 10 controls the MSG processing unit 19 to create an "Assign_ONU-ID" message, but in the case where the RRH 4 coupled to the ONU 2 of the transmission source is not the RRH of the communication destination of the BBU 3, the transmission control unit 10 controls the MSG processing unit 19 not to create an "Assign ONU-ID" message.

Therefore, in the case where the RRH 4 coupled to the ONU 2 of the transmission source is the RRH of the communication destination of the BBU 3, the transmission unit 1b establishes a link to the ONU 2. Accordingly, the BU 3 may communication with the RRH 4 of the communication destination through the transmission unit 1b and the ONU 2.

While, in the present example, the ONU control unit 20 acquires position information from the RRH 4, the position information of the ONU 2 may be used in place of the position information of the RRH 4 similarly as in the example of FIG. 19.

Figure 25:
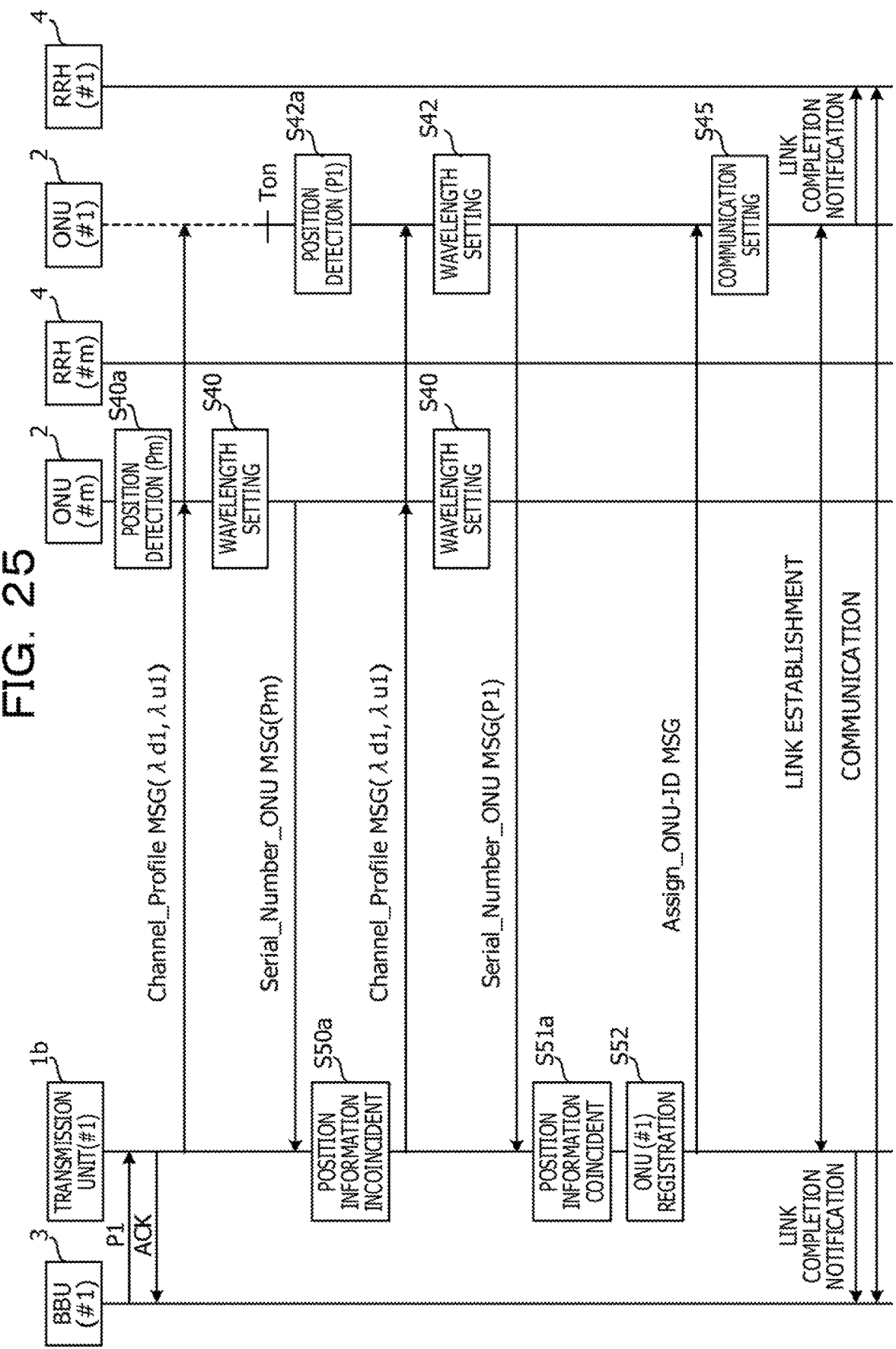
FIG. 25 is a sequence diagram depicting a yet further example of a process for establishing a link between a transmission unit and an ONU.

FIG. 25 is a sequence diagram depicting a yet further example of a process for establishing a link between a transmission unit 1b and an ONU 2. In FIG. 25, like processes to those of FIG. 19 are denoted by like reference characters, and overlapping description of them is omitted.

In the ONUs (#m, #1) 2, the ONU control unit 20 acquires position information Pm and P1 from the GPS communication unit 200 (S40a, S42a) and controls the MSG processing unit 29 to create a "Serial_Number_ONU" message including the position information Pm and P1. The transmission unit (#1) 1b compares the position information Pm in the "Serial_Number_ONU" message received from the ONU (#m) 2 and the position information P1 acquired from the BBU (#1) 3 with each other and decides that they do not coincide with each other (S50a).

Therefore, the transmission unit (#1) 1b does not transmit an "Assign_ONU-ID" message to the ONU (#m) 2. Accordingly, a link is not established between the transmission unit (#1) 1b and the ONU (#m) 2.

Further, the transmission unit (#1) 1b compares the position information P1 in the "Serial_Number_ONU" message received from the ONU (#1) 2 and the position information P1 acquired from the BBU (#1) 3 with each other and decides that they coincide with each other (S51a).

Therefore, the transmission unit (#1) 1b transmits an "Assign_ONU-ID" message to the ONU (#1) 2. Accordingly, a link is established between the transmission unit (#1) 1b and the ONU (#1) 2.

Figure 26:
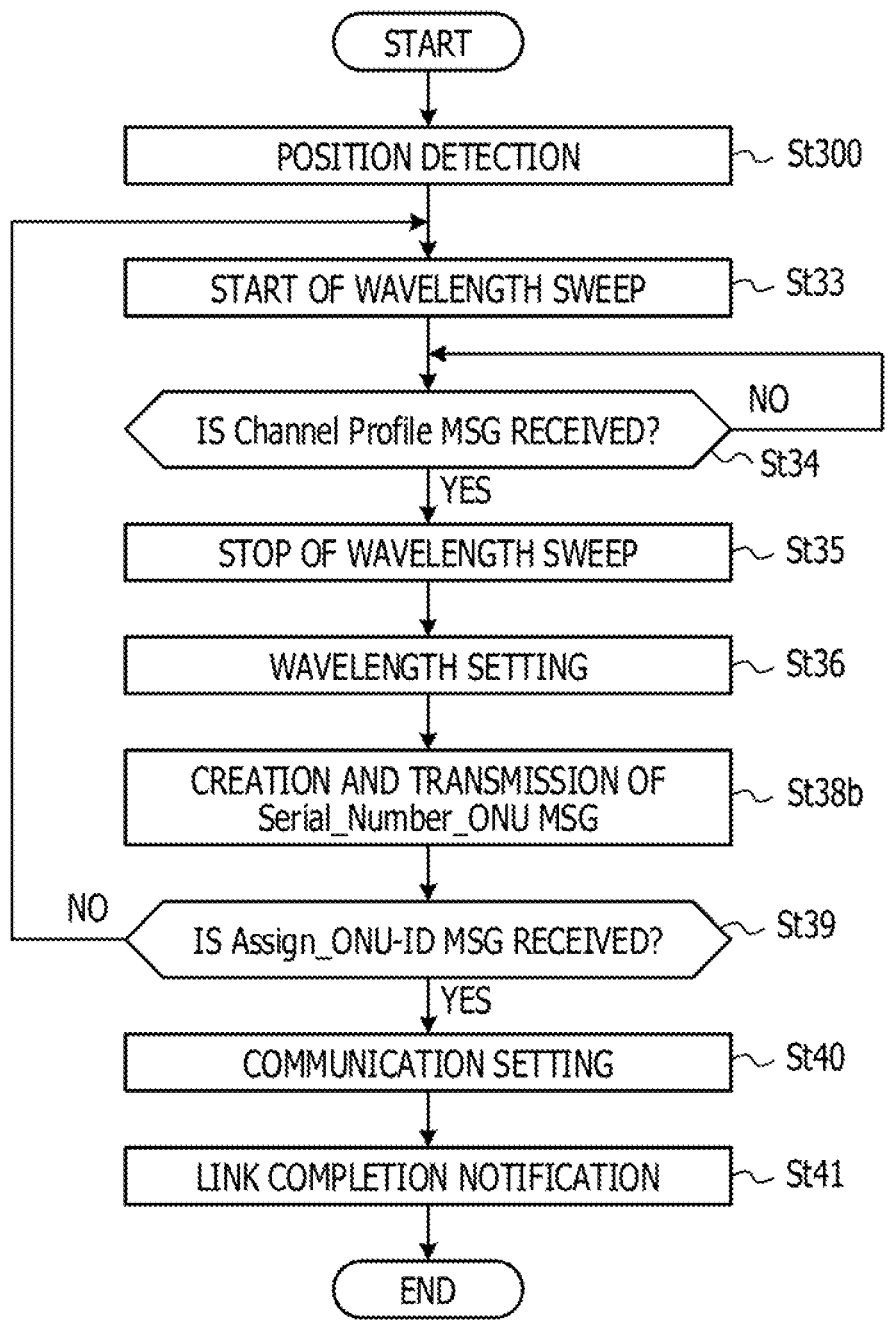
FIG. 26 is a flow chart depicting a still further example of operation of an ONU.

FIG. 26 is a flow chart depicting a still further example of operation of the ONU 2. In FIG. 26, like processes to those of FIG. 20 are denoted by like reference characters, and overlapping description of them is omitted.

After the ONU control unit 20 sets a wavelength (step St36) it controls the MSG processing unit 29 to create a "Serial_Number_ONU" message including the position information detected in step St300, and the transmitter 272 transmits the "Serial_Number_ONU" message (step St38b). Thereafter, processes in the steps beginning with step St39 are executed. The ONU 2 operates in this manner.

In this manner, the ONU control unit 20 detects position information by the GPS communication unit 200. Therefore, the ONU 2 may save time and effort for acquiring position information from the RRH 4.

The embodiments described above are preferred embodiments of the present disclosure. However, the embodiment of the present disclosure is not restrictive, and the present disclosure may be carried out in various modified forms without departing from the subject matter of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission device coupled to a passive optical network together with a plurality of optical termination devices individually coupled to a plurality of remote radio heads, the transmission device comprising:
    an interface configured to acquire, from a base band unit having a communication destination that is one of the plurality of remote radio heads, communication destination information relating to the remote radio head of the communication destination;
    a receiver configured to receive signals of given wavelength from the plurality of optical termination devices; and
    a transmitter configured to transmit a first signal that includes wavelength information indicative of the given wavelength and the communication destination information to the plurality of optical termination devices, wherein,
    when the receiver receives, from an optical termination device of the remote radio head of the communication destination from among the plurality of optical termination devices, a second signal of the given wavelength according to the first signal, the receiver sets, between the receiver and the optical termination device, a relay path that relays communication between the base band unit and the remote radio head of the communication destination.

2. The transmission device according to claim 1, wherein the communication destination information is identification information for identifying the remote radio head of the communication destination from among the plurality of optical termination devices.

3. The transmission device according to claim 1, wherein the communication destination information is position information indicative of a position of the remote radio head of the communication destination from among the plurality of optical termination devices.

4. An optical termination device coupled to a passive optical network together with an optical terminal device coupled to a base band unit and further coupled to a remote radio head, the optical termination device comprising:
    a receiver configured to receive, from the optical terminal device, a first signal including wavelength information indicative of a given wavelength of a signal to be received by the optical termination device and communication destination information relating to the remote radio head of a communication destination of the base band unit;
    a transmitter configured to transmit a signal to the optical terminal device; and
    a processor configured to decide, based on the communication destination information, whether or not the remote radio head is a remote radio head of the communication destination and causes, where the remote radio head is a remote radio head of the communication destination, the transmitter to transmit a second signal of the given wavelength indicated by the wavelength information, wherein,
    when the receiver receives a third signal responsive to the second signal from the optical terminal device, the processor sets, between the processor and the optical terminal device, a relay path for relaying communication between the base band unit and the remote radio head.

5. The optical termination device according to claim 4, wherein
    the processor acquires identification information for identifying the remote radio head from the remote radio head and decides, based on the identification information and the communication destination information, whether or not the remote radio head is a remote radio head of the communication destination.

6. The optical termination device according to claim 4, wherein
    the processor acquires position information indicative of a position of the remote radio head from the remote radio head and decides, based on the position information and the communication destination information, whether or not the remote radio head is a remote radio head of the communication destination.

7. The optical termination device according to claim 4, further comprising:
    a global positioning system receiver configured to detect a position of the optical termination device, wherein
    the processor decides, based on the position of the optical termination device and the communication destination information, whether or not the remote radio head is a remote radio head of the communication destination.

8. A transmission system, comprising:
    an optical terminal device and a plurality of optical termination devices all coupled to a passive optical network;
    the plurality of optical termination devices being individually coupled to a plurality of remote radio heads;
    the optical terminal device including
    an interface configured to acquire, from a base band unit having a communication destination that is one of the plurality of remote radio heads, communication destination information relating to the remote radio head of the communication destination,
    a receiver configured to receive a signal of a given wavelength from any of the plurality of optical termination devices,
    a transmitter configured to transmit a first signal, which includes wavelength information indicative of the given wavelength and the communication destination information, to the plurality of optical termination devices, and
    a setting unit configured to set, when the receiver receives a second signal of the given wavelength according to the first signal from the optical termination device coupled to the remote radio head of the communication destination from among the plurality of optical termination devices, a relay path for relaying communication between the base band unit and the remote radio head of the communication destination between the setting unit and the optical termination device;

each of the plurality optical termination devices being operable to decide, based on the communication information, whether or not the remote radio head of the coupling destination from among the plurality of remote radio heads is the remote radio head of the communication destination and transmit, where the remote radio head of the coupling destination is the remote radio head of the communication destination, the second signal of the given wavelength indicated by the wavelength information to the optical terminal device.

9. The transmission system according to claim 8, wherein
the communication destination information is identification information for identifying the remote radio head of the communication destination from among the plurality of optical termination devices.

10. The transmission system according to claim 8, wherein
the communication destination information is position information indicative of a position of the remote radio head of the communication destination from among the plurality of optical termination devices.

11. A transmission method performed between an optical terminal device and a plurality of optical termination devices all coupled to a passive optical network,
the plurality of optical termination devices being individually coupled to a plurality of remote radio heads,
the transmission method comprising:
acquiring, by the optical terminal device, from a base band unit having a communication destination that is one of the plurality of remote radio heads, communication destination information relating to the remote radio head of the communication destination;
transmitting, by the optical terminal device, a first signal, which includes wavelength information indicative of a wavelength of a signal to be received from each of the plurality of optical termination devices and the communication destination information, to each of the plurality of optical termination devices;
deciding, by each of the plurality of optical termination devices, based on the communication destination information whether or not the remote radio head of the coupling destination from among the plurality of remote radio heads is the remote radio head of the communication destination;
transmitting, by each of the plurality of optical termination devices, where the remote radio head of the coupling destination is the remote radio head of the communication destination, a second signal of a wavelength indicated by the wavelength information to the optical terminal device; and
setting, by the optical terminal device, when the second signal according to the first signal is received from the optical termination device coupled to the remote radio head of the communication destination from among the plurality of optical termination devices, a relay path for relaying communication between the base band unit and the remote radio head of the communication destination between the optical terminal device and the optical termination device.

12. The transmission method according to claim 11, wherein
the communication destination information is identification information for identifying the remote radio head of the communication destination from among the plurality of optical termination devices.

13. The transmission method according to claim 11, wherein
the communication destination information is position information indicative of a position of the remote radio head of the communication destination from among the plurality of optical termination devices.

* * * * *